United States Patent
Lawrenson et al.

(10) Patent No.: US 10,547,217 B2
(45) Date of Patent: Jan. 28, 2020

(54) INHIBITING DISPLACEMENT OF A WIRELESSLY RECHARGEABLE DEVICE

(71) Applicant: TELFONAKTIEBOLAGET LM ERICSSON (PUBL), Stockholm (SE)

(72) Inventors: Matthew John Lawrenson, Bussigny (CH); Julian Charles Nolan, Pully (CH)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/740,506

(22) PCT Filed: Jul. 1, 2015

(86) PCT No.: PCT/SE2015/050775
§ 371 (c)(1),
(2) Date: Dec. 28, 2017

(87) PCT Pub. No.: WO2017/003335
PCT Pub. Date: Jan. 5, 2017

(65) Prior Publication Data
US 2018/0198325 A1    Jul. 12, 2018

(51) Int. Cl.
*H02J 7/02* (2016.01)
*H02J 50/90* (2016.01)
*G06T 7/20* (2017.01)

(52) U.S. Cl.
CPC ............. *H02J 50/90* (2016.02); *G06T 7/20* (2013.01); *H02J 7/025* (2013.01); *G06T 2207/30241* (2013.01)

(58) Field of Classification Search
USPC ......................................................... 320/108
See application file for complete search history.

(56) References Cited

U.S. PATENT DOCUMENTS

| | | | |
|---|---|---|---|
| 2009/0153098 A1* | 6/2009 | Toya ............... | H02J 7/025 320/108 |
| 2013/0241735 A1 | 9/2013 | Nylen et al. | |
| 2014/0015493 A1* | 1/2014 | Wirz ............... | H02J 7/025 320/137 |
| 2015/0022194 A1 | 1/2015 | Almalki et al. | |

OTHER PUBLICATIONS

International Search Report (ISR) and Written Opinion (WO) of the International Searching Authority cited in PCT/SE2015/050775, dated Mar. 9, 2016, 8 pages.

* cited by examiner

*Primary Examiner* — Robert Grant
(74) *Attorney, Agent, or Firm* — Rothwell, Figg, Ernst & Manbeck, P.C.

(57) ABSTRACT

A wirelessly rechargeable device (20) is positioned on an underlying charging surface (S) for charging a battery of the wirelessly rechargeable device. While the wirelessly rechargeable device is charging, it is detected whether the wirelessly rechargeable device is being displaced (A), or is likely to be displaced, relative to the charging surface. Additionally, it is detected whether the displacement, or the potential displacement, is unintentional. In response to detecting that the wirelessly rechargeable device has been displaced, or is likely to be displaced, a magnetic field between the charging surface and the wirelessly rechargeable device is controlled to inhibit the unintentional displacement of the wirelessly rechargeable device.

20 Claims, 21 Drawing Sheets

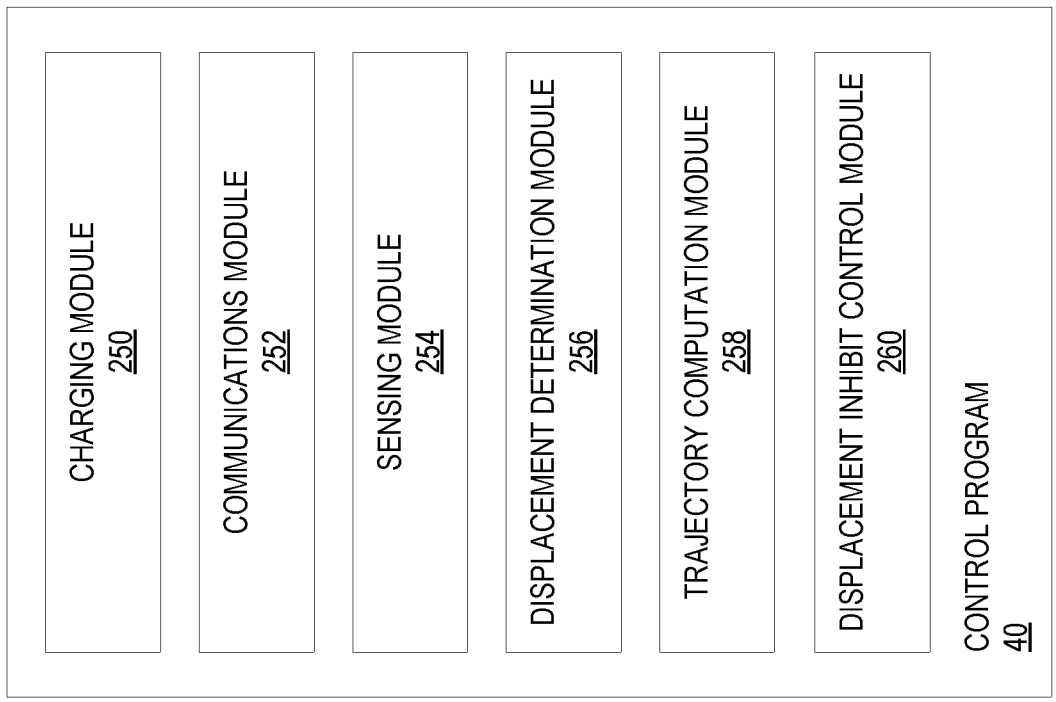

INHIBITING DISPLACEMENT OF A WIRELESSLY RECHARGEABLE DEVICE

CROSS REFERENCE TO RELATED APPLICATION(S)

This application is a 35 U.S.C. § 371 National Stage of International Patent Application No. PCT/SE2015/050775, filed Jul. 1, 2015, designating the United States. The above identified application is incorporated by reference.

TECHNICAL FIELD

The present disclosure relates to a method for inhibiting a displacement of a wirelessly rechargeable device, a wirelessly rechargeable device, and a computer-readable storage medium comprising a control application stored thereon.

BACKGROUND

Many rechargeable devices, such as cellular telephones and other mobile devices, for example, are configured to support wireless charging. As is known in the art, many different vendors offer standalone wireless charging devices (e.g., POWERMAT) that enable a user to recharge the batteries of his/her device. Lately, however, wireless charging technologies are also being supported by a fast growing infrastructure of desks and other furniture that have integrated wireless charging functionality. Further, this support for wireless charging is only expected to increase as wireless charging standards and technologies, such as those associated with QI, POWER MATTERS ALLIANCE (PWA), and ALLIANCE FOR WIRELESS POWER (A4WP), become well established.

For example, many mainstream businesses such as MCDONALDS and STARBUCKS already provide their patrons with desks or tables having integrated wireless charging functionality. Thus, when a patron visits such a business, the patron can lay his/her wirelessly rechargeable device on the surface of such a desk to be recharged. However, desks and other surfaces having integrated wireless charging functionality are not limited solely to the realm of commercial establishments. For example, IKEA offers a table with integrated wireless charging capability for purchase by individuals.

These types of "charging surfaces" are beneficial in that they allow a user to recharge his/her device using a normal-looking piece of furniture. That is, there is no need for additional standalone devices that must rest on the top surface of the furniture. However, while resting on such surfaces, a wirelessly rechargeable device is prone to being accidentally knocked off of the charging surface and onto the floor, where it might be damaged.

SUMMARY

The present disclosure provides a method, a wirelessly rechargeable device, and a corresponding computer-readable storage medium having instructions stored thereon, for inhibiting the unintentional displacement of the wirelessly rechargeable device across the surface of a wireless charger on which it is being charged.

In one embodiment, the wirelessly rechargeable device is positioned on the charging surface of a wireless charging device. While the wirelessly rechargeable device is resting on the charging surface, a displacement of the wirelessly rechargeable device is detected. In response to the detection, a magnetic field generated by one or both of the wirelessly rechargeable device and the charging device is controlled to inhibit the unintentional displacement of the wirelessly rechargeable device relative to the charging surface.

In one embodiment, it is also determined whether the displacement is an actual unintentional displacement of the wirelessly rechargeable device, or an impending displacement of the wirelessly rechargeable device.

In some embodiments, to perform this determination, a plurality of images of an object approaching the wirelessly rechargeable device is captured while the wirelessly rechargeable device is resting on the charging surface. Based on processing the plurality of images, it is determined whether an impending contact between the object and the wirelessly rechargeable device will result in an unintentional displacement of the wirelessly rechargeable device, or an intended displacement of the wirelessly rechargeable device.

In other embodiments, the displacement is detected as being a substantially horizontal movement of the wirelessly rechargeable device across the charging surface. A plurality of images of a user positioned proximate the wirelessly rechargeable device is captured, and the plurality of images is processed to determine whether the user is substantially stationary relative to the charging surface. If the user is substantially stationary, it is determined that the wirelessly rechargeable device has been unintentionally displaced.

In some embodiments, the displacement of the wirelessly rechargeable device is detected by measuring movement of the wirelessly rechargeable device using one or more sensors. The movement is then classified as an intended displacement of the wirelessly rechargeable device, or an unintentional displacement of the wirelessly rechargeable device, based on the measured movement.

For example, in some embodiments, the movement is classified as an intended displacement if the wirelessly rechargeable device is being moved substantially vertically with respect to the charging surface, or as an unintentional displacement if the wirelessly rechargeable device is being moved substantially horizontally with respect to the charging surface.

In some embodiments, controlling the magnetic field comprises controlling the magnetic field generated by one or both of the wirelessly rechargeable device and the charging device to magnetically attract the wirelessly rechargeable device to the charging surface.

Additionally, some embodiments of the present disclosure compute a displacement trajectory for the wirelessly rechargeable device across the charging surface. Based on the computed displacement trajectory, these embodiments control selected charging coils associated with the charging surface to generate corresponding magnetic fields to magnetically attract the wirelessly rechargeable device to the charging surface.

In one embodiment, the displacement trajectory for the wirelessly rechargeable device is computed by measuring changes in the magnetic fields as the wirelessly rechargeable device moves across the charging surface, and then computing the displacement trajectory based on the measured changes.

In other embodiments, the displacement trajectory for the wirelessly rechargeable device is computed by capturing a plurality of images as the wirelessly rechargeable device moves across the charging surface and processing the plurality of images to determine an acceleration and direction of movement of the wirelessly rechargeable device.

In some embodiments, the method further comprises determining that the wirelessly rechargeable device being displaced will contact a second wirelessly rechargeable device resting on the charging surface. Upon the detection, one or more of the charging coils associated with the charging surface are controlled to magnetically attract both the wirelessly rechargeable device and the second wirelessly rechargeable device to the charging surface.

In at least one embodiment, the method detects whether the wirelessly rechargeable device is likely to fall over an edge of the charging surface and onto an underlying surface. If so, orientation of the wirelessly rechargeable device is changed so that if the wirelessly rechargeable device falls, the device falls in an orientation determined least likely to cause damage to the wirelessly rechargeable device.

In one embodiment, the wirelessly rechargeable device is oriented by selectively controlling the magnetic fields generated by one or both of the wirelessly rechargeable device and the charging surface such that a heaviest part of the wirelessly rechargeable device is likely to strike the underlying surface first.

Additionally, in any of the embodiments, all of the charging coils associated with the charging surface may be controlled to magnetically attract the wirelessly rechargeable device to the charging surface if the displacement trajectory of the wirelessly rechargeable device cannot be computed.

In one embodiment, the present disclosure provides a wirelessly rechargeable device comprising a battery, a charging circuit, and a processing circuit operatively connected to the charging circuit. In this embodiment, the charging circuit is configured to charge the battery when the wirelessly rechargeable device is resting on a charging surface, and also to generate a magnetic field to inhibit an unintentional displacement of the wirelessly rechargeable device relative to the charging surface. The processing circuit detects that the wirelessly rechargeable device has been displaced, or is likely to be displaced, while the wirelessly rechargeable device is resting on the charging surface. In response to detecting that the wirelessly rechargeable device has been displaced, or is likely to be displaced, the processing circuit controls the charging circuit to control the generated magnetic field to inhibit the unintentional displacement of the wirelessly rechargeable device relative to the charging surface.

In some embodiments, the processing circuit also determines whether the displacement is an actual unintentional displacement of the wirelessly rechargeable device, or an impending displacement of the wirelessly rechargeable device.

In some embodiments, the processing circuit also captures a plurality of images of an object approaching the wirelessly rechargeable device while the wirelessly rechargeable device is resting on the charging surface, and predicts, based on processing the plurality of images, whether an impending contact between the object and the wirelessly rechargeable device will result in an unintentional displacement of the wirelessly rechargeable device, or an intended displacement of the wirelessly rechargeable device.

In some embodiments, the processing circuit is further configured to detect a substantially horizontal movement of the wirelessly rechargeable device across the charging surface, and capture a plurality of images of a user positioned proximate the wirelessly rechargeable device. The processing circuit also processes the plurality of images to determine whether the user is substantially stationary relative to the charging surface. If the user is substantially stationary, the processing circuit determines that the wirelessly rechargeable device has been unintentionally displaced.

In other embodiments, the processing circuit measures movement of the wirelessly rechargeable device using one or more sensors, and classifies the movement as an intended displacement of the wirelessly rechargeable device, or an unintentional displacement of the wirelessly rechargeable device, based on the measured movement.

In these embodiments, the movement is classified as an intended displacement if the wirelessly rechargeable device is being moved substantially vertically with respect to the charging surface, or as an unintentional displacement if the wirelessly rechargeable device is being moved substantially horizontally with respect to the charging surface.

In at least one embodiment, the processing circuit controls the magnetic field generated by one or both of the wirelessly rechargeable device and the charging device to magnetically attract the wirelessly rechargeable device to the charging surface.

Additionally, in one embodiment, the processing circuit computes a displacement trajectory for the wirelessly rechargeable device across the charging surface. Based on the computed displacement trajectory, the processing circuit controls selected charging coils associated with the charging surface to generate corresponding magnetic fields to magnetically attract the wirelessly rechargeable device to the charging surface.

In some embodiments, the processing circuit measures changes in the magnetic fields as the wirelessly rechargeable device moves across the charging surface, and computes the displacement trajectory based on the measured changes.

In one embodiment, to compute the displacement trajectory for the wirelessly rechargeable device, the processing circuit captures a plurality of images as the wirelessly rechargeable device moves across the charging surface, and processes the plurality of images to determine an acceleration and direction of movement of the wirelessly rechargeable device.

In at least one embodiment, the processing circuit determines that the wirelessly rechargeable device being displaced will contact a second wirelessly rechargeable device resting on the charging surface, and controls one or more of the charging coils associated with the charging surface to magnetically attract both the wirelessly rechargeable device and the second wirelessly rechargeable device to the charging surface.

In some embodiments, the processing circuit detects that the wirelessly rechargeable device is likely to fall over an edge of the charging surface and onto an underlying surface. In response to the detection, the processing circuit orients the wirelessly rechargeable device to fall in an orientation determined least likely to cause damage to the wirelessly rechargeable device.

To orient the wirelessly rechargeable device, the processing circuit, in one embodiment, selectively controls the magnetic fields generated by one or both of the wirelessly rechargeable device and the charging surface such that a heaviest part of the wirelessly rechargeable device is likely to strike the underlying surface first.

Additionally, in one embodiment, the processing circuit controls all of the charging coils associated with the charging surface to magnetically attract the wirelessly rechargeable device to the charging surface if the displacement trajectory of the wirelessly rechargeable device cannot be computed.

In addition, the present disclosure also provides a computer-readable storage medium. A control application is stored thereon that, when executed by processing circuit of a wirelessly rechargeable device resting on a charging surface, controls the processing circuit to detect a displacement of the wirelessly rechargeable device. The displacement comprises one of an intended displacement of the wirelessly rechargeable device relative to the charging surface, and an unintended displacement of the wirelessly rechargeable device relative to the charging surface. In response to detecting an unintended displacement of the wirelessly rechargeable device, the control application controls the processing circuit to control a magnetic field generated by one or both of the wirelessly rechargeable device and the charging device to inhibit the unintended displacement of the wirelessly rechargeable device relative to the charging surface.

BRIEF DESCRIPTION OF THE DRAWINGS

FIG. 15 is a functional module diagram of a control application configured to control a processing circuit according to one embodiment of the present disclosure.

DETAILED DESCRIPTION

Figure 1:
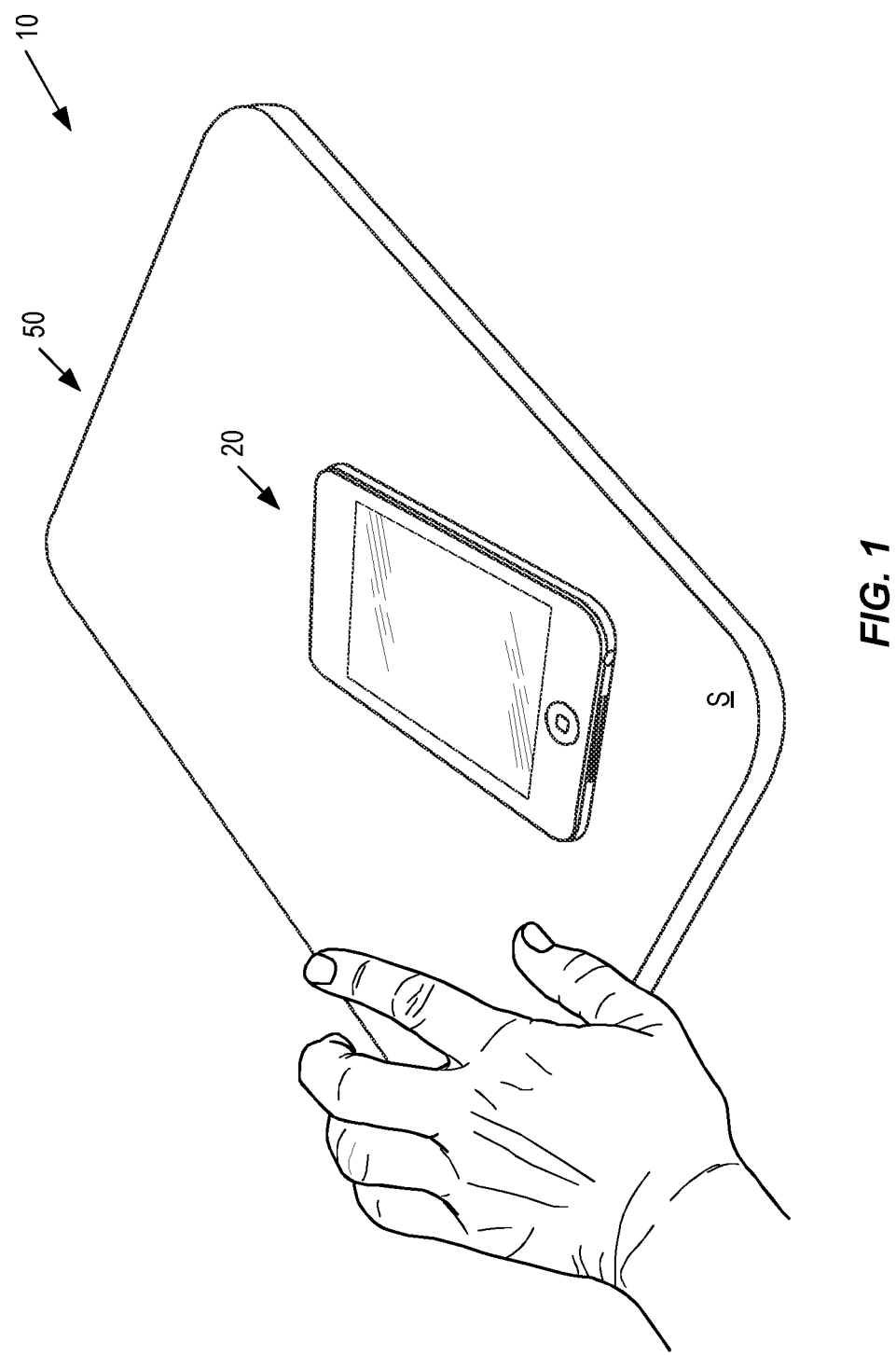
FIG. 1 is a perspective view of a system for charging a wirelessly rechargeable device according to one embodiment of the present disclosure.

The infrastructure to support the wireless charging of wirelessly rechargeable devices, such as cellular telephones, laptop and notebook computing devices, so-called smartwatches, and the like, continues to grow at a fast pace. Such devices not only include standalone wireless charging mats that are disposed on the surface of an underlying desk or table, but also include desks, tables, and other furniture that have integrated such wireless charging functionality.

These "wireless charging surfaces" are beneficial because they allow users to charge and recharge the batteries in their devices merely by laying the device on top of the surface. That is, no charging cables are needed between the charging surface and the device being charged. However, they are also not without their problems. For example, devices resting on top of a charging surface are apt to be accidentally displaced or knocked off the surface altogether while being charged. Often times, such accidental displacements of the device are caused by users who inadvertently knock into the device or the wireless charger while the device is charging, or into furniture (e.g., a desk) that integrates the wireless charging functionality. This can result in damage to the devices being charged.

Current solutions for prohibiting the movement of a wirelessly rechargeable device across a wireless charging surface are not particularly desirable. One such solution, for example, calls for making the surface of the wireless charger sticky or "tacky." However, sticky surfaces attract dust and other particulate matter that can reduce the effectiveness of the sticky surface over time. Further, in some cases, the device being charged may not be easily detached or removed from a sticky wireless charging surface.

Another solution utilizes notifications, such as a flashing light or audible indication, for example, to alert a user that a device is being charged. These solutions, however, may draw unwanted attention to the charging device itself, thereby detracting from brand and product qualities.

Solutions that integrate charging circuits into a desk or table often times have recesses or "wells" in which a device rests while being charged. However, such recesses often collect dust and dirt. This can be especially problematic for commercial establishments that must keep these areas clean. Further, it is not often that such recesses are large enough to accommodate the many different shapes and sizes of wirelessly rechargeable devices, thereby limiting the number of charging positions on a given desk or table.

Accordingly, embodiments of the present disclosure provide a device and corresponding method for inhibiting the unintentional movement of a wirelessly rechargeable device across a given charging surface. Particularly, the embodiments of the disclosure determine whether a wirelessly rechargeable device is currently in motion across the charging surface, or is likely to be set in motion across the charging surface, and if so, whether that motion is intended or unintended by the user. If the detected motion is unintended, embodiments of the present disclosure perform different functions to inhibit that motion across the charging surface. By way of example only, one or both of the charging device and the wirelessly rechargeable device may be controlled to magnetically attract the wirelessly rechargeable device to the charging surface. In cases where the motion cannot be sufficiently inhibited and the wirelessly rechargeable device is in danger of falling over the edge of the charging surface, embodiments of the present disclosure will reorient the wirelessly rechargeable device with respect to the charging surface such that the device is likely to fall in an orientation least likely to cause damage to the device.

Turning now to the drawings, FIG. 1 is a perspective view illustrating a charging system 10 configured according to embodiments of the present disclosure. As seen in FIG. 1, charging system 10 comprises a wirelessly rechargeable device 20 resting on the charging surface S. In this embodiment, wirelessly rechargeable device 20 is a cellular telephone, and the charging surface S, which is generally flat, is the top surface of a charging mat 50 configured to inductively charge the batteries of wirelessly rechargeable device 20. However, those of ordinary skill in the art should appreciate that this is for illustrative purposes only. The wirelessly rechargeable device 20 may be any type of portable consumer electronic device having rechargeable batteries that are capable of being charged wirelessly, such as a tablet or notebook computer, various BLUETOOTH devices, and so-called smartwatches, for example. Additionally, as described in later embodiments, charging surface S may be the top surface of a piece of furniture, such as a table or desk, for example, that integrates the charging circuits required to inductively charge the battery of the wirelessly rechargeable device 20.

The present disclosure may utilize any of a variety of principles to inhibit the unintentional movement of wirelessly rechargeable device 20 across the charging surface S. However, one embodiment of the present disclosure controls a magnetic field that is generated by one or both of the charging device 50 and the wirelessly rechargeable device 20 to magnetically attract the wirelessly rechargeable device 20 to the charging surface S of charging device 50.

Figure 2:
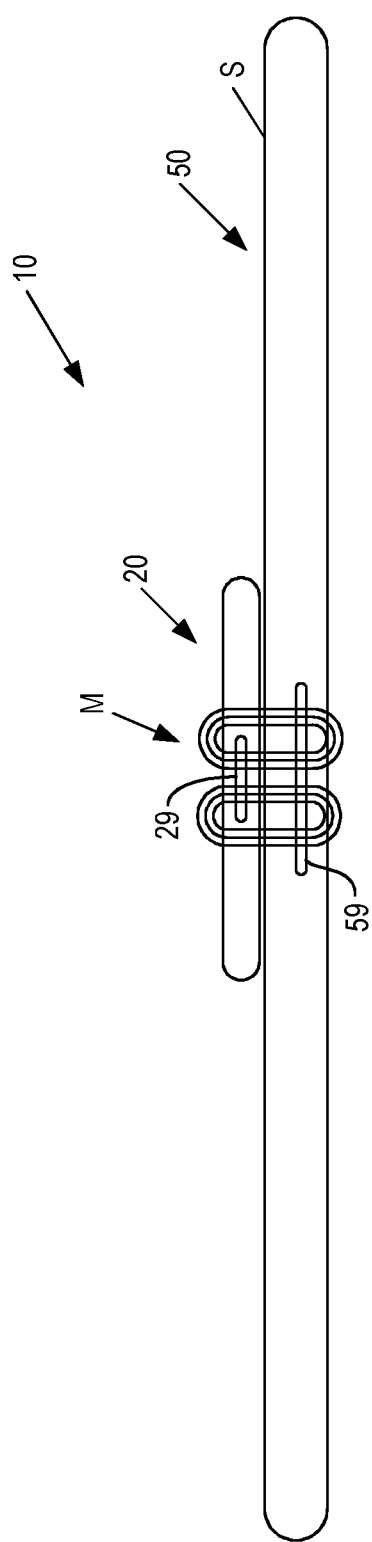
FIG. 2 is a side view of a charging device charging a wirelessly rechargeable device according to one embodiment of the present disclosure.

More particularly, as seen in FIG. 2, both the wirelessly rechargeable device 20 and the charging device 50 comprise respective coils 29, 59. When an electric current is passed through coils 59, an electromagnetic field M is generated in coils 59. This electromagnetic field M, in turn, induces an electrical current in coils 29 that is then utilized to charge the battery of wirelessly rechargeable device 20. According to embodiments of the present disclosure, a current flowing through one or both of the coils 29, 59 may be controlled such that the magnetic field M attracts the wirelessly rechargeable device, temporarily, to charging surface S. This temporary attraction prevents, or at least greatly reduces, the ability of the wirelessly rechargeable device to move or slide across charging surface S.

In some cases, preventing wirelessly rechargeable device 20 from sliding all the way across charging surface S may not be possible. For example, an inadvertent contact that caused wirelessly rechargeable device 20 to slide across charging surface S may have been so hard that the wirelessly rechargeable device 20 is likely to fall over the edge of charging surface S and onto the floor. With situations such as these, the fall to the floor may result in damage to wirelessly rechargeable device 20. Therefore, as described later in more detail, some embodiments of the present disclosure control the current flowing through one or both of the coils 29, 59 to alter the orientation of wirelessly rechargeable device 20 as it slides across charging surface S. The reorientation positions wirelessly rechargeable device 20 such that if it does fall over the edge of charging surface S, it falls in a position that is least likely to result in damage to wirelessly rechargeable device 20.

It should be understood by those of ordinary skill in the art that "tightly-coupled" wireless charging systems (e.g., those using inductive charging methods) are not the only systems suitable for use with the present embodiments. "Loosely-coupled" wireless charging systems (e.g., those using resonant inductive coupling) are equally as suitable. With these systems, both coils 29, 59 have a capacitive load, thereby forming corresponding first and second inductor-capacitor (LC) circuits. When each LC circuit is tuned to resonate at the same frequency, power can be transmitted over a longer range than loosely-coupled inductors alone. In embodiments that are associated with resonant inductive coupling, respective magnetic fields M are generated that attract at least a part of wirelessly rechargeable device 20 to charging surface S, or that orient wirelessly rechargeable device 20 with respect to charging surface S to minimize or eliminate any damage that may result from wirelessly rechargeable device 20 falling over the edge of charging surface S.

In some embodiments, the magnetic fields that are utilized to retard or prohibit the unintentional movement of a wirelessly rechargeable device 20 are DC fields, i.e. substantially static magnetic fields. In other embodiments, AC magnetic fields are used to prohibit the unintentional motion. However, in these latter embodiments, synchronization may be required between the components that generate such fields.

In yet another embodiment, one or both of the wirelessly rechargeable device 20 and the charging device 50 further comprise one or more electromagnets. In these embodiments, an electric current is controlled to flow through one or both of the electromagnets to induce magnetic field M. The magnetic field M, in turn, will temporarily attract wirelessly rechargeable device 20 to charging surface S, or reorient wirelessly rechargeable device 20 to minimize damage to wirelessly rechargeable device 20 should it fall over the edge of charging surface S.

Figure 3:
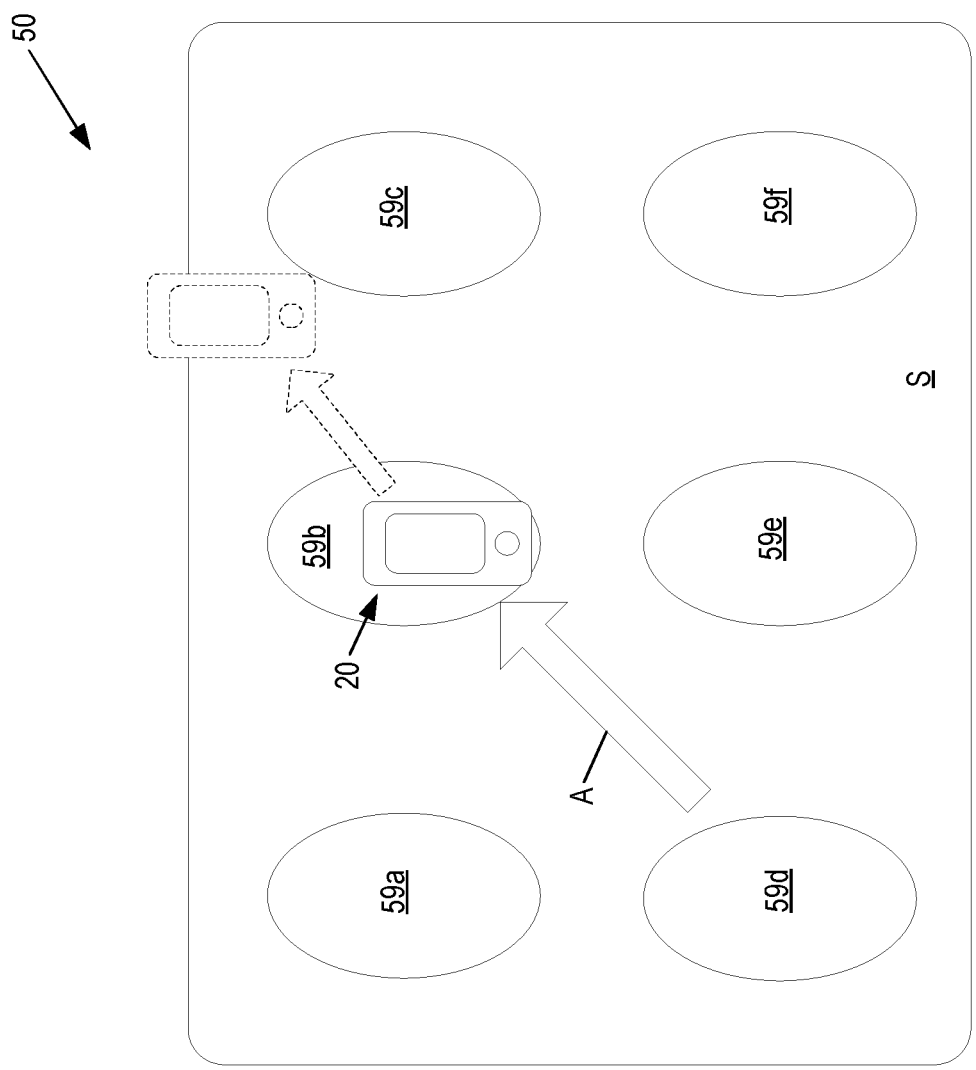
FIG. 3 illustrates one embodiment of the present disclosure in which a wirelessly rechargeable device is inhibited from being unintentionally displaced relative to a charging surface.

FIGS. 3 and 4A-4D illustrate embodiments of the present disclosure in which the wirelessly rechargeable device is inhibited from being unintentionally displaced across charging surface S. More particularly, FIG. 3 illustrates wirelessly rechargeable device 20 resting on charging surface S of charging device 50 while it is being charged. As seen in FIG. 3, charging device 50 may comprise a plurality of charging coils 59a, 59b, 59c, 59d, 59e, 59f (collectively referred to as "coils 59"). Each of these coils 59 is configured as a "charging position" to charge a device with a rechargeable battery as previously described. As illustrated by arrow A, a user may accidentally contact device 20 with his/her hand or arm while device 20 is being charged. Such contact may be hard enough to cause device 20 to slide off of the charging position defined by coils 59b and across charging surface S, as seen by the dashed arrow. Therefore, one or both of the charging coils 29, 59b, may be controlled to control the magnetic field M to magnetically attract device 20 to surface S. This attraction is temporary, lasting as long as the magnetic field M is generated, but effectively inhibits or prevents the undesired movement of device 20 across charging surface S.

Figure 4A:
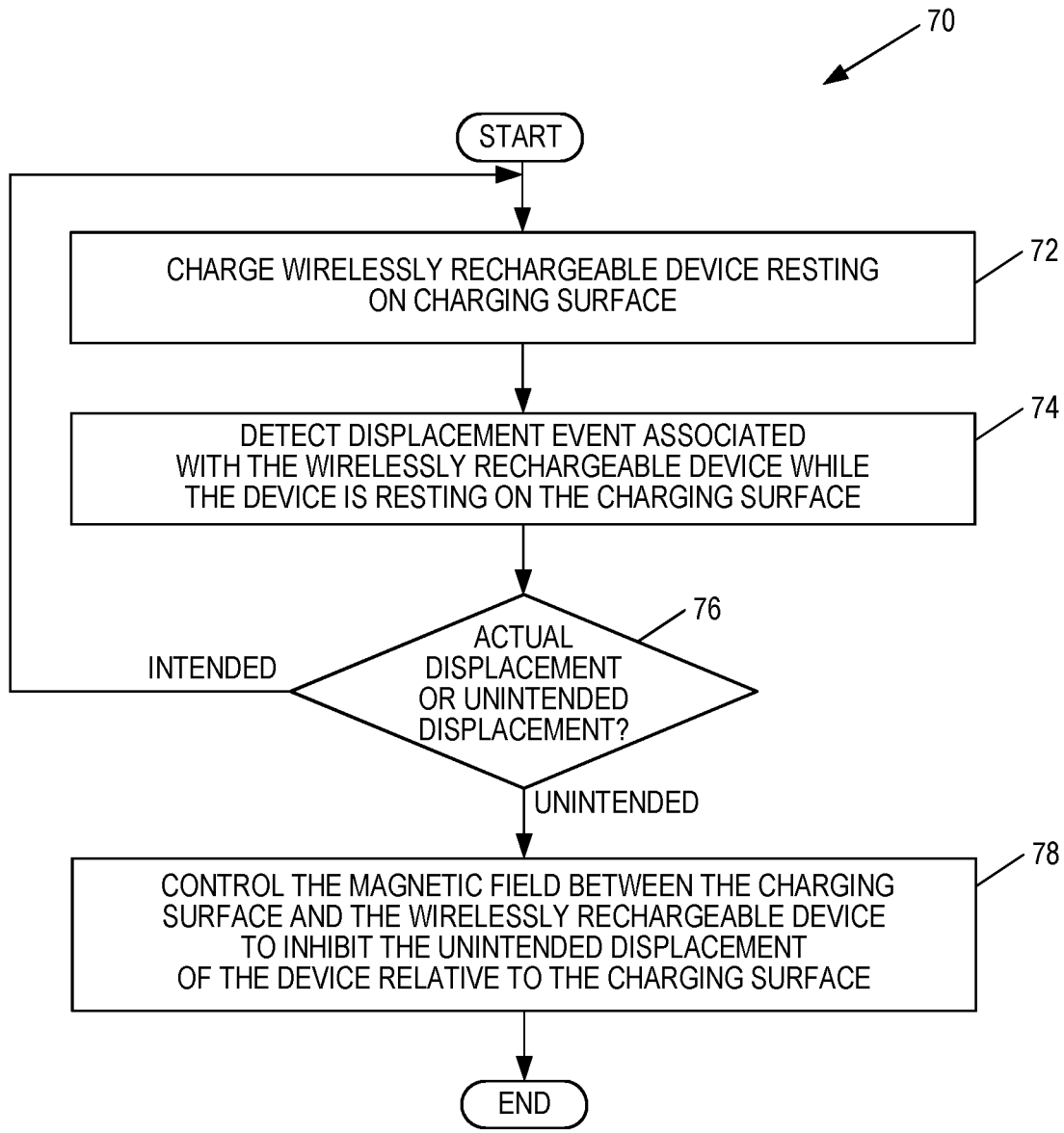
FIGS. 4A-4D are flow diagrams illustrating methods for inhibiting the unintentional displacement of a wirelessly rechargeable device across a surface of a charging device according to various embodiments of the present disclosure.
Figure 4B:
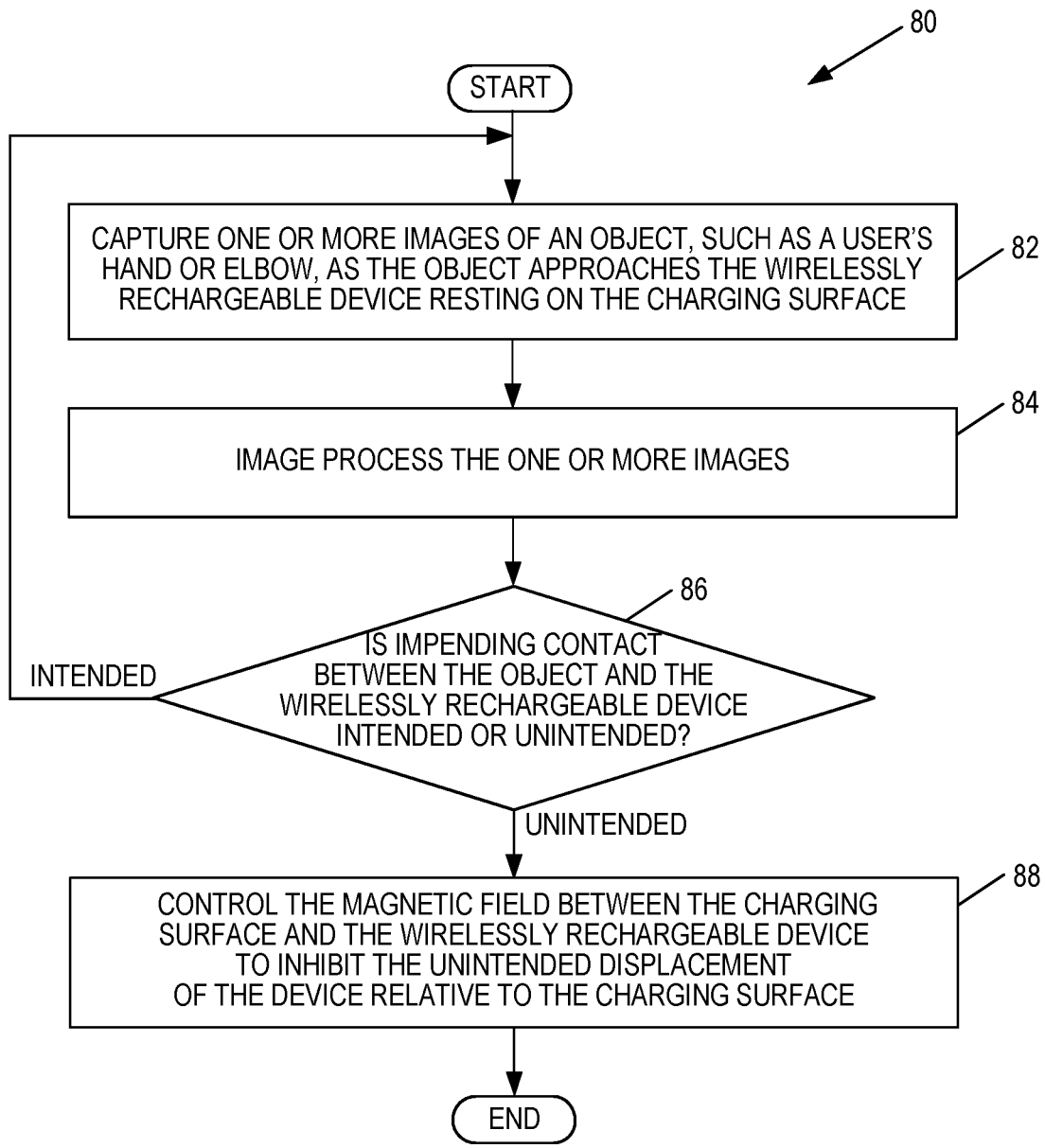

FIG. 4A is a flow diagram illustrating a method 70 for inhibiting the unintentional displacement of device 20. In this embodiment, method 70 is performed by a processing circuit at the user's wirelessly rechargeable device 20. However, those of ordinary skill in the art should appreciate that this is for illustrative purposes only. Method 70 may be performed by circuitry solely at device 20, or solely at charging device 50, or, in the case of some embodiments, cooperatively by circuitry at both devices 20 and 50.

Method 70 begins with device 20 being placed, as is conventional, over a charging position (e.g., over coil 59b) to be recharged (box 72). So long as device 20 remains substantially motionless on charging surface S, charging device 50 will charge the batteries of device 20. However, device 20 is configured, according to various embodiments, to detect a "displacement event" associated with the wirelessly rechargeable device 20 while device 20 rests on charging surface S (box 74). Such a displacement event indicates whether device 20 is being displaced across charging surface S, or is likely to be displaced across charging surface S. In response to detecting a displacement event, wirelessly rechargeable device 20 will then determine whether the displacement (or potential displacement) is an intended displacement, such as when the user lifts device 20 off of charging surface S, or is an unintentional displacement, such as might occur when the user accidentally contacts device 20 (box 76). Displacement classified as intended displacements are ignored by device 20. Unintentional displacements, however, are not. Rather, device 20 is configured to control the magnetic field M generated by one or both of device 20 and device 50 such that it is temporarily magnetically attracted to charging surface S and prevented or inhibited from moving across charging surface S (box 78).

Detecting a displacement event, and determining whether that detected event is intended or unintentional, may be accomplished using any of a variety of methods and technologies. In one embodiment, shown in method 80 of FIG. 4B, for example, device 20 controls its integrated camera to capture a series of one or more images of an object as the object approaches device 20 (box 82). The object may be, for example, the user's hand, elbow, or some other part of the user's body. Device 20 then utilizes known image processing techniques to process the captured images (box 84). Based on an analysis of the processed images, device 20 will determine whether an impending contact between the object and device 20 is intended (e.g., the user is reaching to remove the phone from the charging surface S), or inadvertent (e.g., the user accidentally knocked into device 20) (box 86). As stated above, contact that is likely to cause an intended displacement is ignored by device 20. Contact that is likely to cause an unintentional displacement triggers device 20 to control the magnetic field M between the charging surface S and the wirelessly rechargeable device 20 to inhibit the unintended displacement of the wirelessly rechargeable device relative to the charging surface S (box 88). By way of example only, the wirelessly rechargeable device 20 may control the magnetic field M generated by one or both of device 20 and device 50 to temporarily attract device 20 to charging surface S.

Figure 4C:
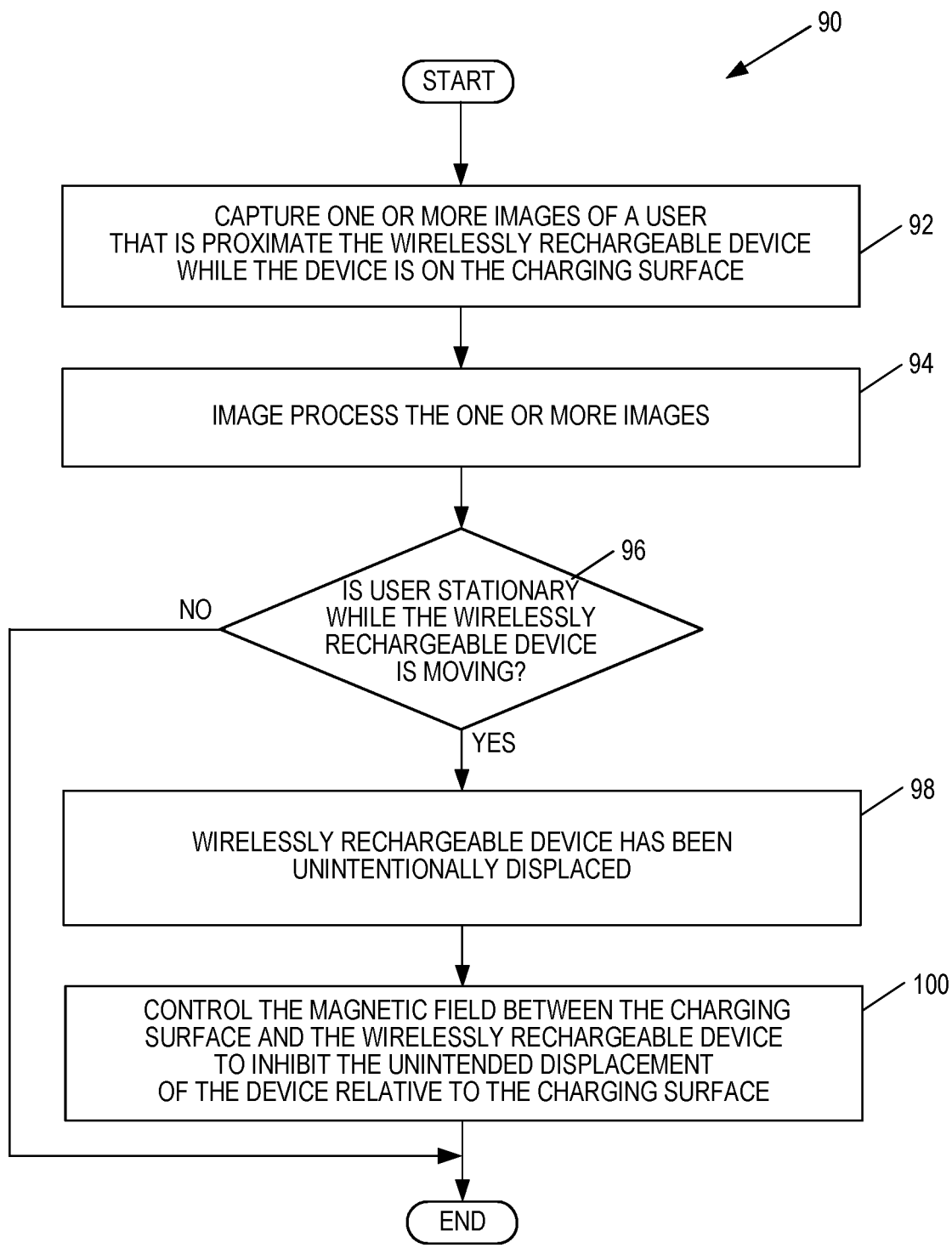

Method 90 of FIG. 4C shows another embodiment in which device 20 detects whether its movement across charging surface S is intentional or unintentional. In this embodiment, device 20 first captures a plurality of images in series using its integrated camera such that device 20 captures images of an object proximate the charging surface S (box 92). The object may be, for example, the user, and the camera may be triggered to capture images periodically, or responsive to a sensed contact at device 20. Regardless, device 20 then analyzes the captured images (box 94) to determine whether the user proximate device 20 is stationary (box 96). If the analysis indicates that the user is not stationary with respect to the charging surface, then the user is moving relative to device 20. In these cases, device 20 may determine, for example, that the user has intentionally removed device 20 from the charging surface S, and is walking away from the charging surface S holding device 20. Thus, device 20 could consider the detected movement as being intentional and the method ends. However, it the analysis indicates that the user is substantially stationary relative to charging surface S, device 20 may determine that the user is not walking away from the charging surface S holding device 20. Since device 20 is moving while the user is not, device 20 could determine that it has been unintentionally displaced across charging surface S (box 98). In these latter cases, device 20 controls the magnetic field M between the charging surface S and the wirelessly rechargeable device 20 to inhibit the unintended displacement of the wirelessly rechargeable device 20 relative to the charging surface S (box 100). As above, inhibiting the unintended movement of device 20 may comprise, for example, device 20 controlling the magnetic field M generated by one or both of device 20 and device 50 to temporarily attract device 20 to charging surface S.

Figure 4D:
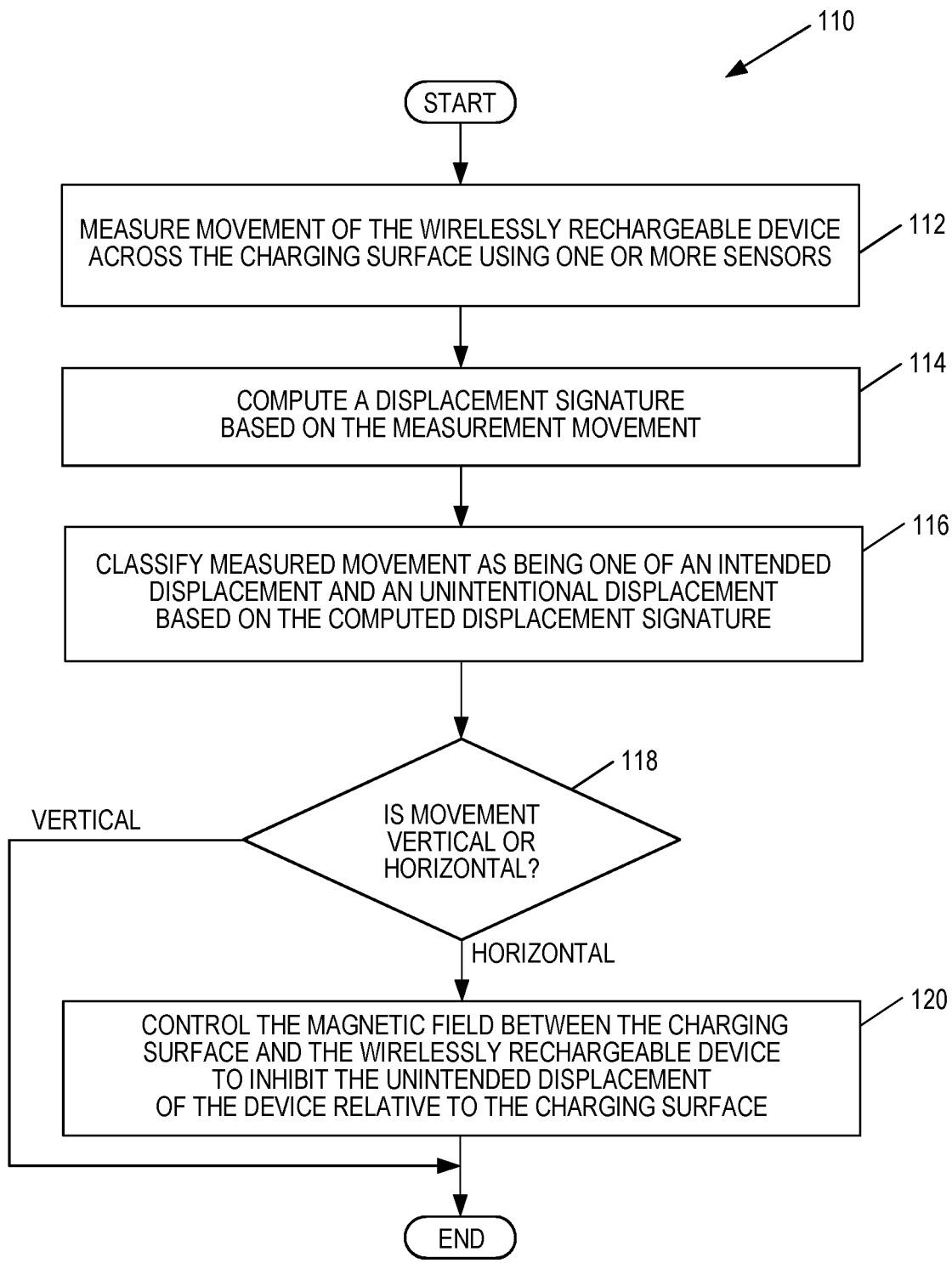

Method 110 of FIG. 4D is a flow diagram illustrating another embodiment by which device 20 is configured to detect, and inhibit, the unintentional displacement of device 20 across charging surface S. In this embodiment, device 20 comprises one or more sensors that are configured to measure movement of device 20 (box 112). The sensors may be any sensors known in the art, but in this embodiment, comprise an accelerometer that measures an acceleration of the wirelessly rechargeable device 20. For example, when device 20 is resting over coil 59b, device 20 is substantially motionless. Thus, a processing circuit in device 20 may not receive a signal from the accelerometer, which would indicate that device 20 is stationary. Upon being displaced, the accelerometer could generate a signal indicating the displacement to the processing circuit. Of course, other methods of determining movement are also possible; however, regardless of the type sensors, device 20 is configured according to this embodiment to compute a displacement signature based on the measured movement (box 114), and based on that signature, to classify the movement of device 20 as being either an intended displacement or an unintended displacement (box 116).

For example, a user that retrieves device 20 from the charging surface S will typically lift device 20 vertically with respect to the charger surface, while a device that is unintentionally displaced will generally move horizontally with respect to the charger surface. The accelerometer in device 20 could sense the displacement, and generate a signal to indicate that displacement. However, the accelerometer may not be configured to indicate whether the displacement is vertical or horizontal. Therefore, responsive to the signal from the accelerometer, a camera at device 20 could also be activated to capture a plurality of images. Processing the images to determine displacement relative to its surroundings, for example, will help device 20 determine whether it is moving substantially vertically or substantially horizontally with respect to the charging surface S. If device 20 determines it is moving vertically, the processed information could be converted to one or more values (i.e., a displacement signature) using any means known in the art, categorized as being an intended vertical movement, and then saved to a memory at device 20 as a displacement signature indicating an intended vertical displacement. Thereafter, whenever device 20 detects displacement, device 20 computes a displacement signature for comparison against the saved signatures. If the computed displacement signature matches a saved displacement signature (box 118), device 20 can determine that displacement is vertical, and thus, likely an intended displacement. In this case, the method may end. If the computed signature does not match a saved signature (box 118), however, device 20 may determine that the detected displacement is horizontal, and thus, control the magnetic field M between the charging surface S and the wirelessly rechargeable device 20 to inhibit the unintended displacement of the wirelessly rechargeable device 20 relative to the charging surface S (box 120). As was the case with the previous embodiments, device 20 may temporarily inhibit such unintended displacement by controlling the magnetic field M generated by one or both of device 20 and device 50 to temporarily attract device 20 to charging surface S.

Figure 5:
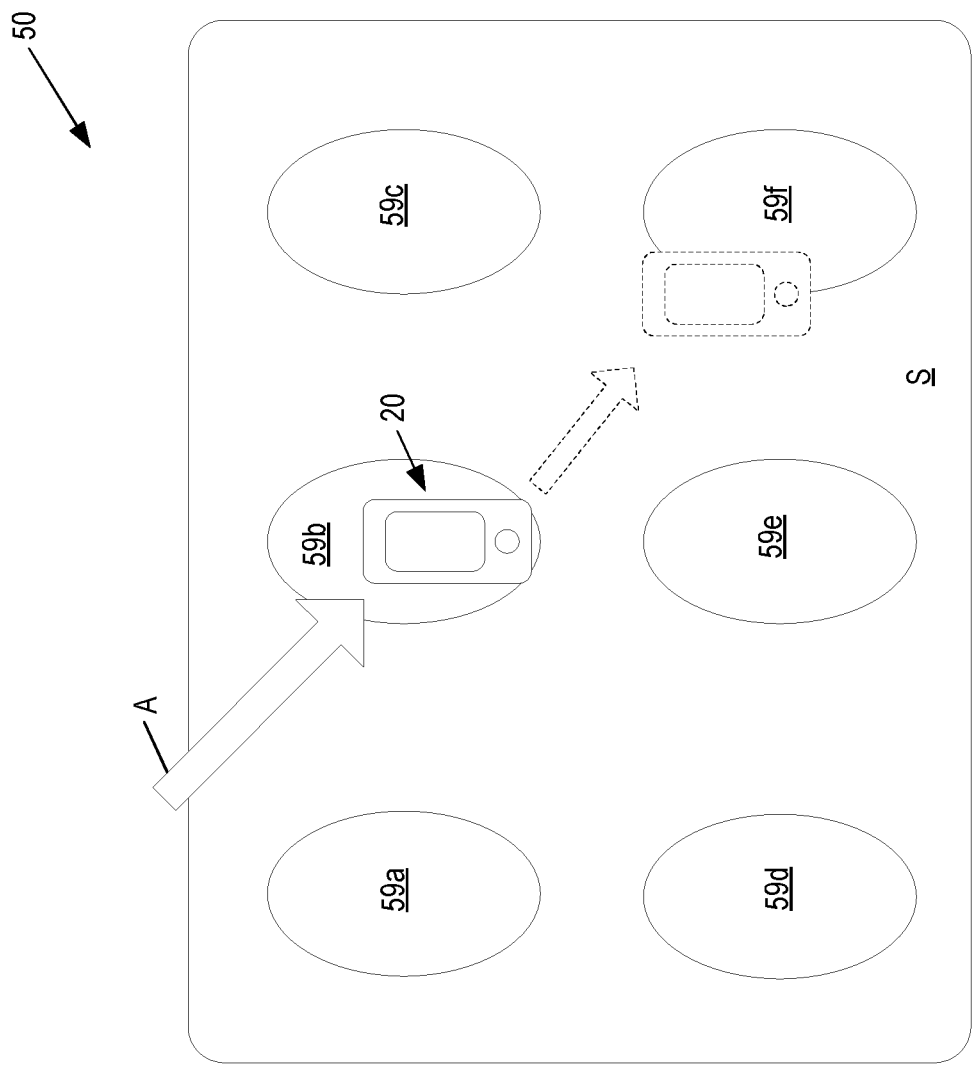
FIG. 5 illustrates one embodiment of the present disclosure in which a wirelessly rechargeable device is inhibited from being unintentionally displaced over a predicted trajectory relative to a charging surface.

In some simple embodiments, controlling the magnetic field M to inhibit the displacement of device 20 comprises controlling all the coils 59 of device 50 to magnetically attract device 20 to charging surface S. This is an "all-or-none" approach in which either all the coils 59 are controlled to inhibit the unintentional displacement of the wirelessly rechargeable device 20, or none of the coils 59 are controlled to inhibit the unintentional displacement of the wirelessly rechargeable device 20. However, the present disclosure is not so limited. In other embodiments of the present disclosure, such as the embodiment seen in FIG. 5, for example, device 20 is first configured to determine a trajectory over the charging surface S for its displacement, and then based on that trajectory control only selected charging coils 59 to control their magnetic fields M.

Figure 6A:
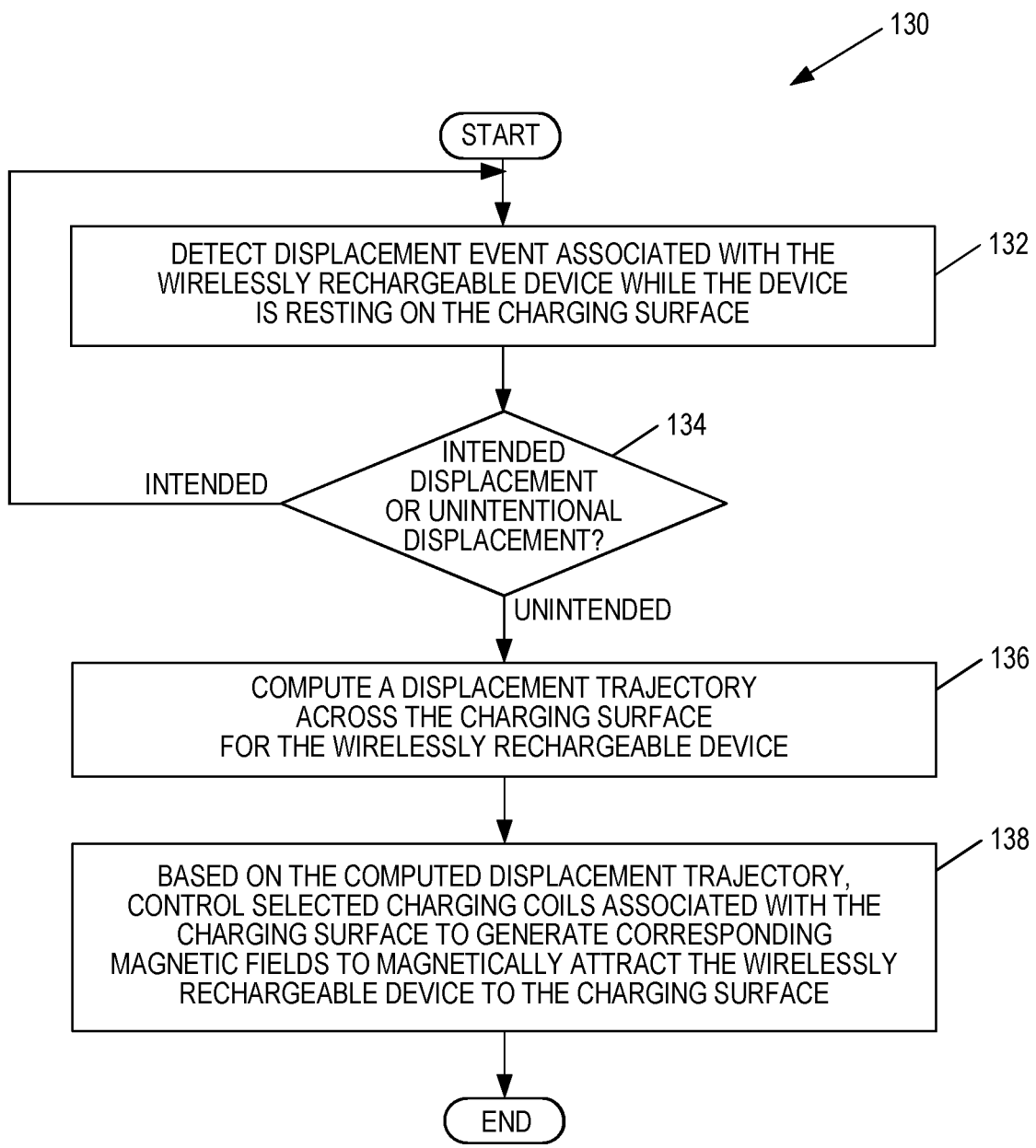
FIGS. 6A-6B are flow diagrams illustrating methods for inhibiting the unintentional displacement of a wirelessly rechargeable device over a predicted trajectory relative to a surface of a charging device according to various embodiments of the present disclosure.

FIG. 6A is a flowchart that illustrates a method 130 in which device 20 is configured to compute a displacement trajectory and to control selected charging coils 59 based on that computed trajectory. Method 130 begins with device 20 detecting a displacement event while it rests on charging surface S (box 132), and then determining whether the displacement event is an intended displacement or an unintentional displacement (box 134). Intended displacements are ignored. However, unintentional displacements will trigger device 20 to compute a displacement trajectory across the charging surface S (box 136). Based on the computed trajectory, device 20 will determine which specific coils of device 50 are along the trajectory and generate the signals necessary to control only the magnetic fields M generated only by those coils (box 138).

Figure 6B:
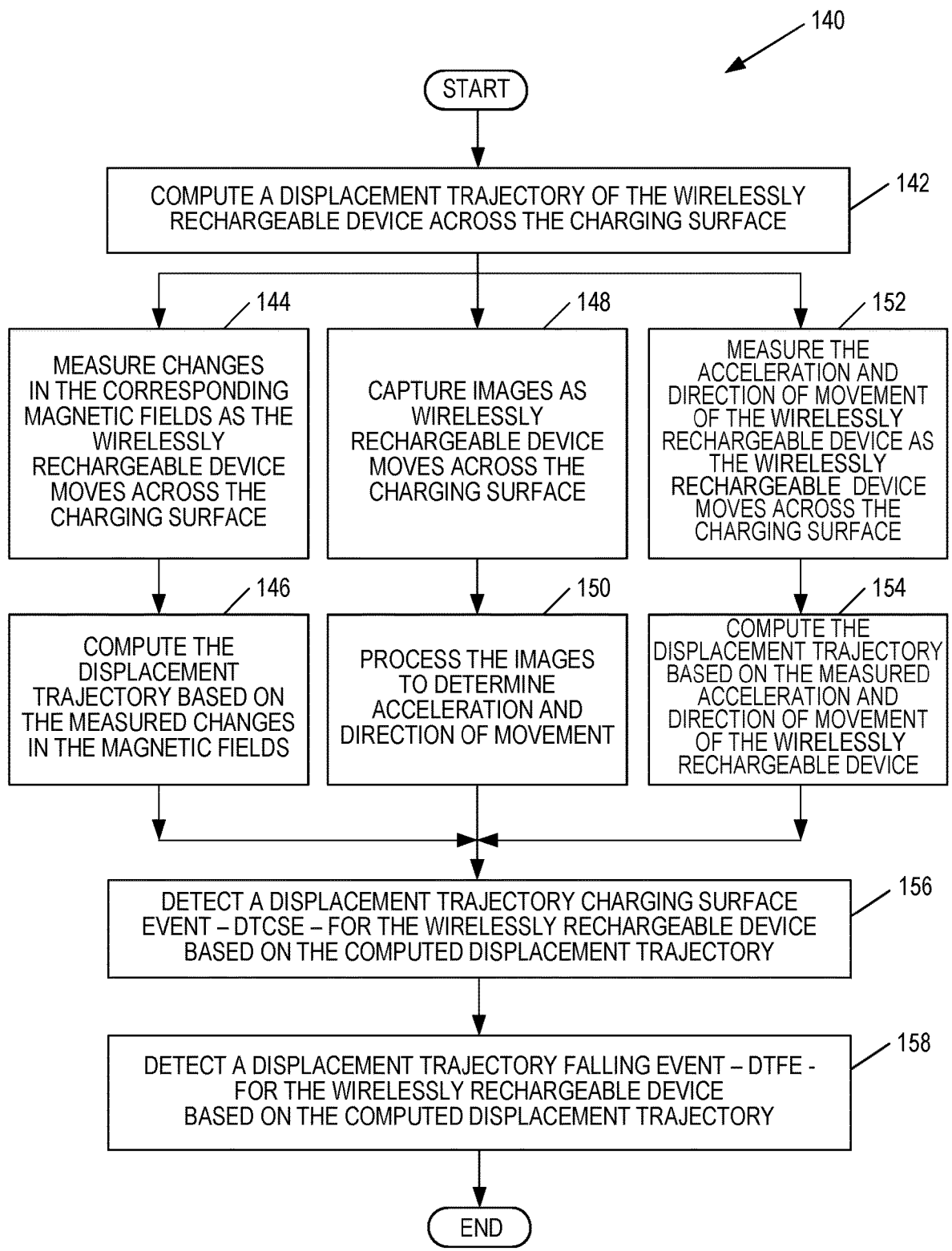

As seen in method 140 of FIG. 6B, there are various methods by which device 20 may compute a displacement trajectory (box 142). In one embodiment, for example, device 20 comprises one or more sensors that are able to measure changes in the magnetic fields M of the coils 59 as device 20 moves over the coils 59 (box 144). Device 20 could be provisioned with the particular positions of the coils 59 in device 50, or receive information about the positions from charging device 50. Based on the detected magnetic field changes of the coils 59 that have already been affected by the displaced device 20, device 20 would be able to compute the displacement trajectory by identifying which of the other coils 59 are likely to be affected by the displaced device 20 (box 146).

In another embodiment, device 20 controls its camera to capture images of its surroundings as it displaces across the charging surface S (box 148). Based on processing these images, device 20 is able to determine not only its movement, but also its acceleration and direction of movement (box 150). It should be noted here that methods for processing images to determine acceleration and movement are well-known in the art. Thus, they are not described in detail here. However, it is sufficient to understand that device 20 is able to compute its displacement trajectory based on this information.

In a similar embodiment, device 20 is configured to measure its acceleration and direction of displacement across charging surface S utilizing an integrated accelerometer and camera (box 152). For example, device 20 may detect movement upon receiving a signal from its accelerometer, and then capture a sequence of images of its surrounding environment. The images may then be processed to determine, for example, a relative change of one or more stationary objects (e.g., pictures, lamps, etc.). Based on this information, and/or according to the process previously described, device 20 is able to compute its displacement trajectory (box 154).

Regardless of the manner in which device 20 computes its displacement trajectory, however, device 20 may use the displacement trajectory to determine whether it will be displaced, or is likely to be displaced, across one or more charging surfaces (i.e., a Displacement Trajectory Charging Surface Event (DTCSE)) (box 156) and/or will fall over the edge of, or is likely to fall over the edge of, a charging surface (i.e., a Displacement Trajectory Falling Event (DTFE)) (box 158). Particularly, as seen in more detail later, determining whether these events will occur, or are likely to occur, allows device 20 to control how its displacement is inhibited across one or more charging surfaces S, as well as its orientation if it is likely that device 20 will fall off one of the charging surfaces S and onto the floor.

Figure 7:
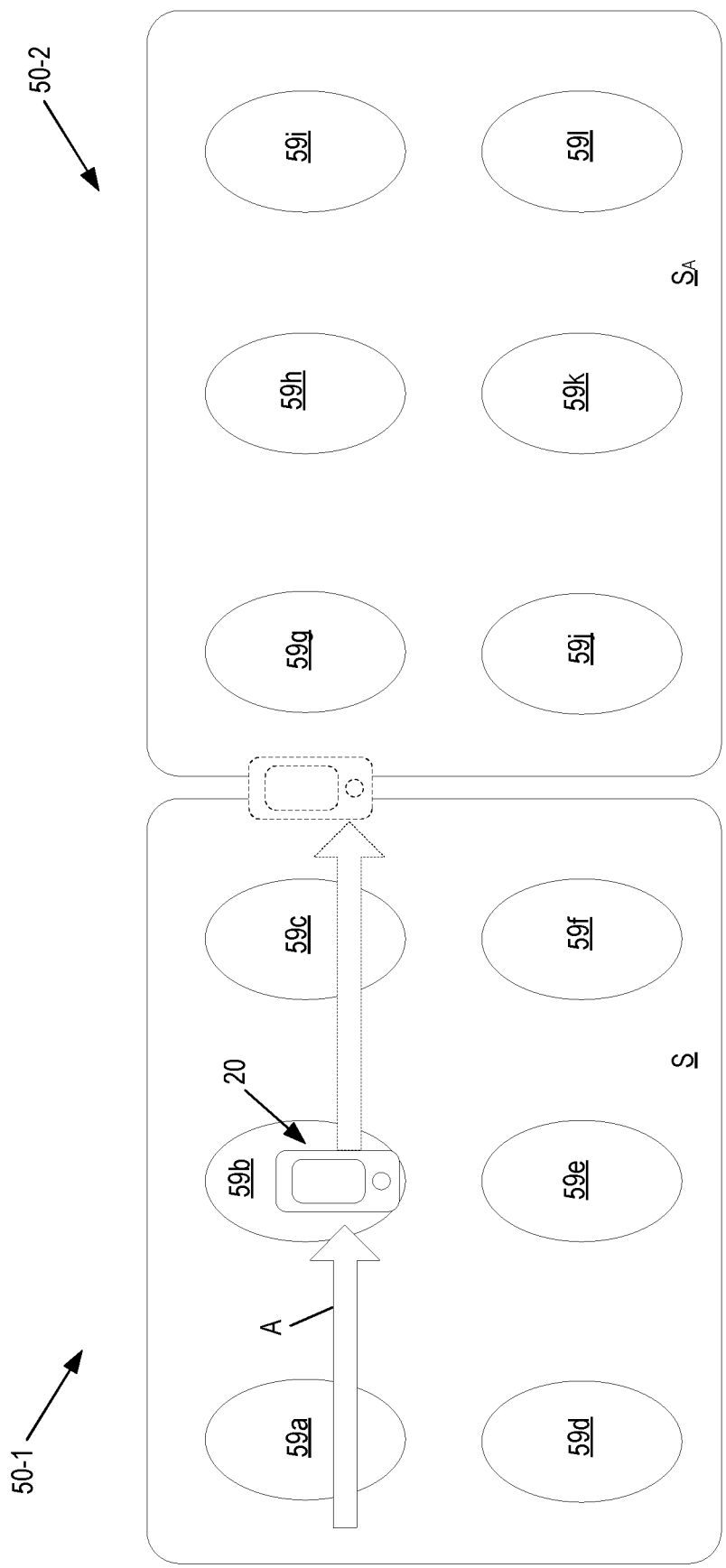
FIG. 7 illustrates one embodiment of the present disclosure in which a wirelessly rechargeable device is inhibited from being unintentionally displaced across the surfaces of one or more adjacent charging devices.

FIG. 7 illustrates an embodiment in which there are two charging surfaces proximate each other—charging surface S and an adjacent charging surface $S_A$—each with their own set of charging coils 59a-59l. Such may occur in cases where multiple charging devices 50-1 and 50-2 are integrated into a large table or desk, for example.

As seen in FIG. 7, contact between an object and device 20 may be hard enough in some instances to displace device 20 over charging surface S and onto charging surface $S_A$. By determining whether it will be displaced over another charging surface $S_A$, or will likely be displaced over another charging surface $S_A$, device 20 may be able to control selected ones of coils 59a-59f to inhibit the displacement of device 20 before device 20 displaces across the surface of the charging surface $S_A$. If device 20 cannot inhibit the movement of device 20 enough to prevent device 20 from being displaced over charging surface $S_A$, then device 20 is configured to also control the coils 59g-59l of the adjacent charging surface $S_A$ to inhibit the displacement over that surface as well.

Figure 8A:
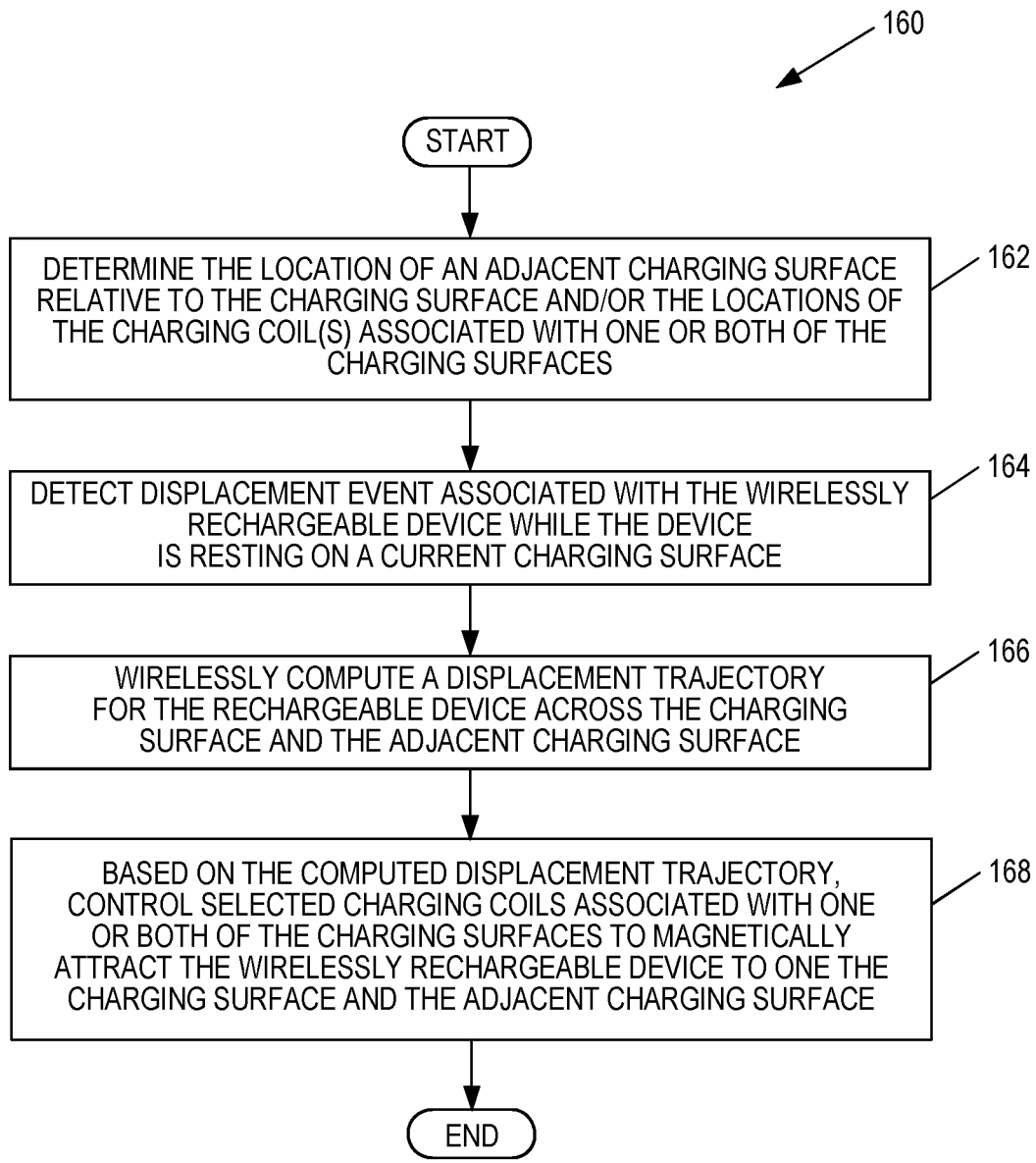
FIGS. 8A-8B are flow diagrams illustrating methods for inhibiting the unintentional displacement of a wirelessly rechargeable device across the surfaces of one or more adjacent charging devices according to various embodiments of the present disclosure.

FIG. 8A is a flow diagram illustrating a method 160 in which device 20 can control the coils 59 of one or both of the charging surfaces S, $S_A$, to inhibit its displacement across one or both of these surfaces. In more detail, device 20 first determines the location of the charging surfaces S, $S_A$, as well as the particular positions of their respective coils 59a-59l (box 162). This information, which is stored in memory of device 20, may be pre-provisioned by a user or may be obtained directly from the charging devices 50-1, 50-2 via a wireless communication link. With the locations known, device 20 detects a displacement event (box 164) and computes a displacement trajectory (box 166), as previously described. Then, based on the computed trajectory, device 20 generates one or more control signals to control its own coils 29, and/or one or more selected coils 59a-59l of one or both of the charging surfaces S, $S_A$, to magnetically attract the device 20 to the charging surface (box 168).

Figure 8B:
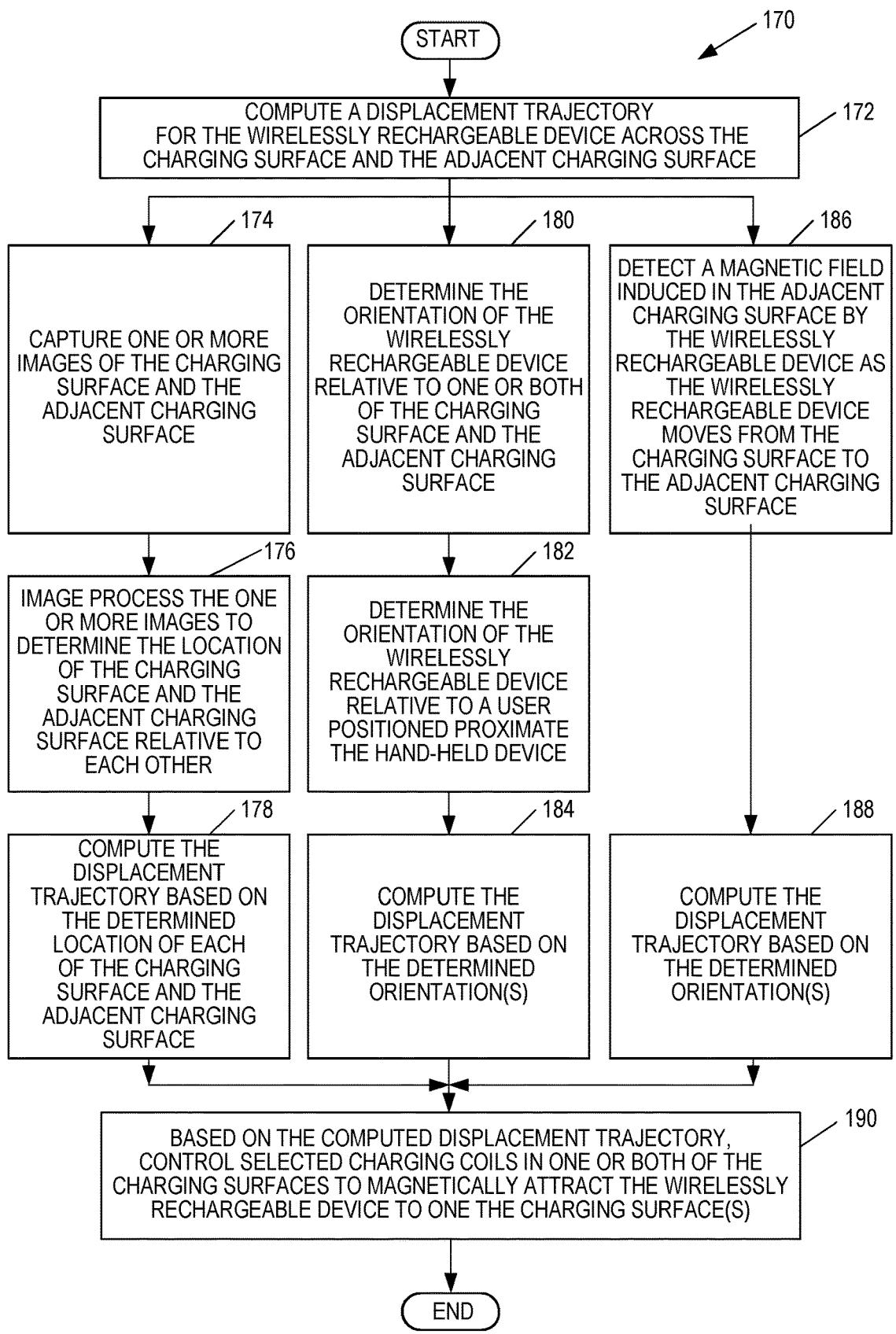

FIG. 8B illustrates other methods 170 by which device 20 can compute a displacement trajectory across the charging surfaces S, $S_A$ (box 172). For example, in one embodiment, device 20 captures one or more images of the charging surfaces S, $S_A$ (box 174), and processes those images to identify the locations of the charging surfaces S, $S_A$ relative to each other (box 176). With these locations known, device 20 can easily compute the displacement trajectory across one or both of the charging surfaces S, $S_A$ (box 178).

In another embodiment, device 20 will determine its current orientation relative to one or both of the charging surfaces S, $S_A$ (box 180). By way of example, device 20 may use its camera to capture images of its surroundings and determine its orientation relative to charging surfaces S, $S_A$ based on image processing those images. Device 20 will then also determine its orientation relative to a user who is proximate the charging surfaces S, $S_A$ (box 182). Based on the determined orientations, device 20 may compute the displacement trajectory across one or both of these surfaces S, $S_A$ upon detecting that it has been displaced (box 184).

In another embodiment, device 20 is configured, as previously described, to detect changes induced in its coils 29 caused by coils 59 as device 20 moves over the charging surfaces S, $S_A$ (box 186). Based on these measurements, device 20 can compute, as previously described, its displacement trajectory across one or both of the charging surfaces S, $S_A$ (box 188). Regardless of the particular technique, however, device 20 is configured to generate the control signals necessary to control the magnetic field M generated by its own coils 29, and/or selected coils 59 in one or both of the charging surfaces S, $S_A$, to inhibit the unintended displacement of device 20 across one or both of the charging surfaces S, $S_A$ (box 190).

Figure 9:
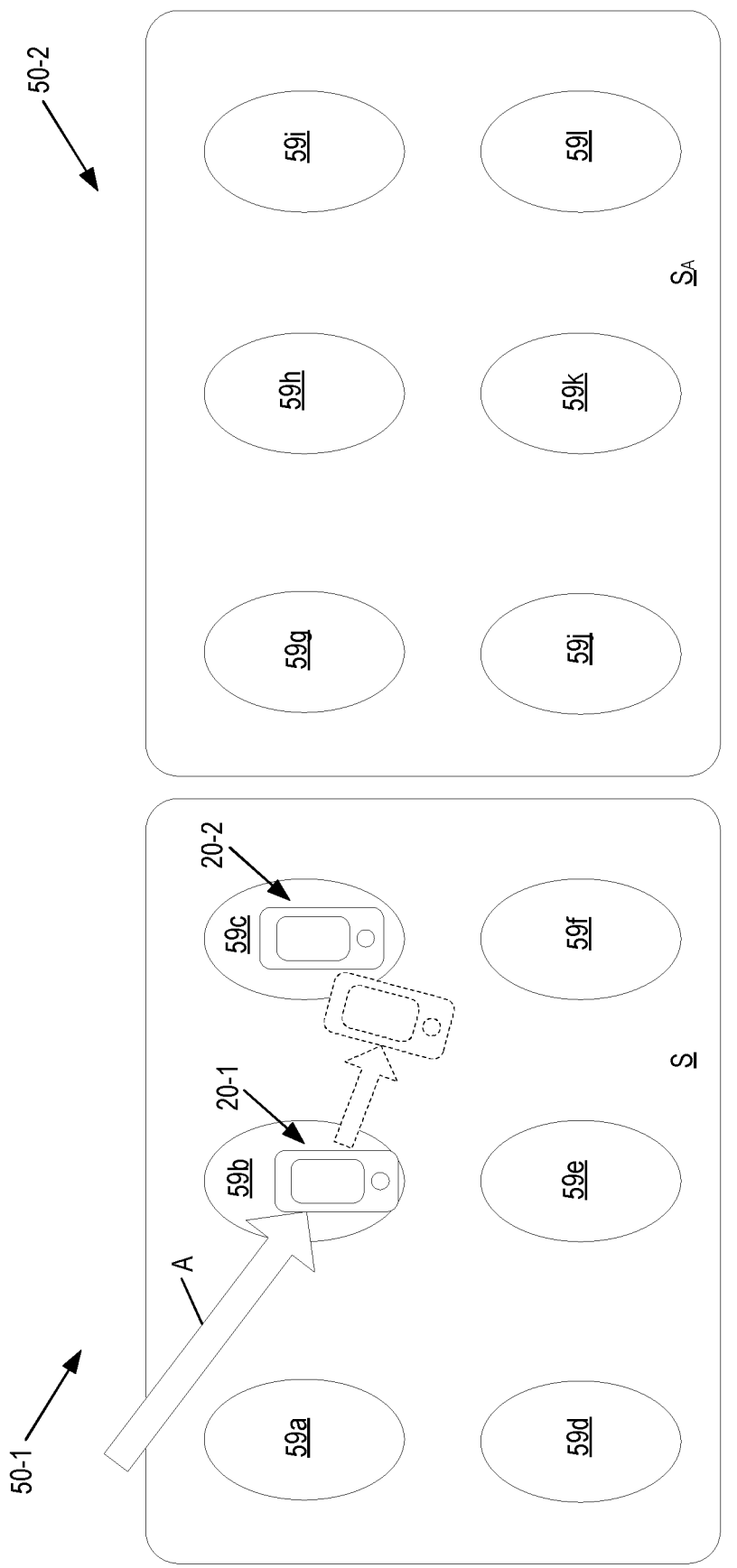
FIG. 9 illustrates one embodiment of the present disclosure in which a wirelessly rechargeable device being unintentionally displaced across the surface of a charging device contacts another wirelessly rechargeable device resting on the surface.

The previous embodiments detail how a device 20 functions to inhibit its unintended displacement across one or more charging surfaces S, $S_A$. However, as seen in FIG. 9, the present disclosure is not so limited. In some embodiments, the present disclosure also configured the device 20 to control a magnetic field M to inhibit the unintended displacement of other devices 20 that may be resting on charging surface S. For example, as seen in FIG. 9, an object such as the user's hand, for example, has contacted a first wirelessly rechargeable device 20-1. Due to that contact, it is likely that device 20-1 will strike another device 20-2 resting on the charging surface S, thereby causing the unintended displacement of that device 20-2 as well. In these situations, the present embodiments are configured to selectively control the coils of each of the devices 20-1 and 20-2, as well as the coils 59 of one or both of the charging surfaces S, $S_A$, to inhibit the unintended movement of both devices.

Figure 10:
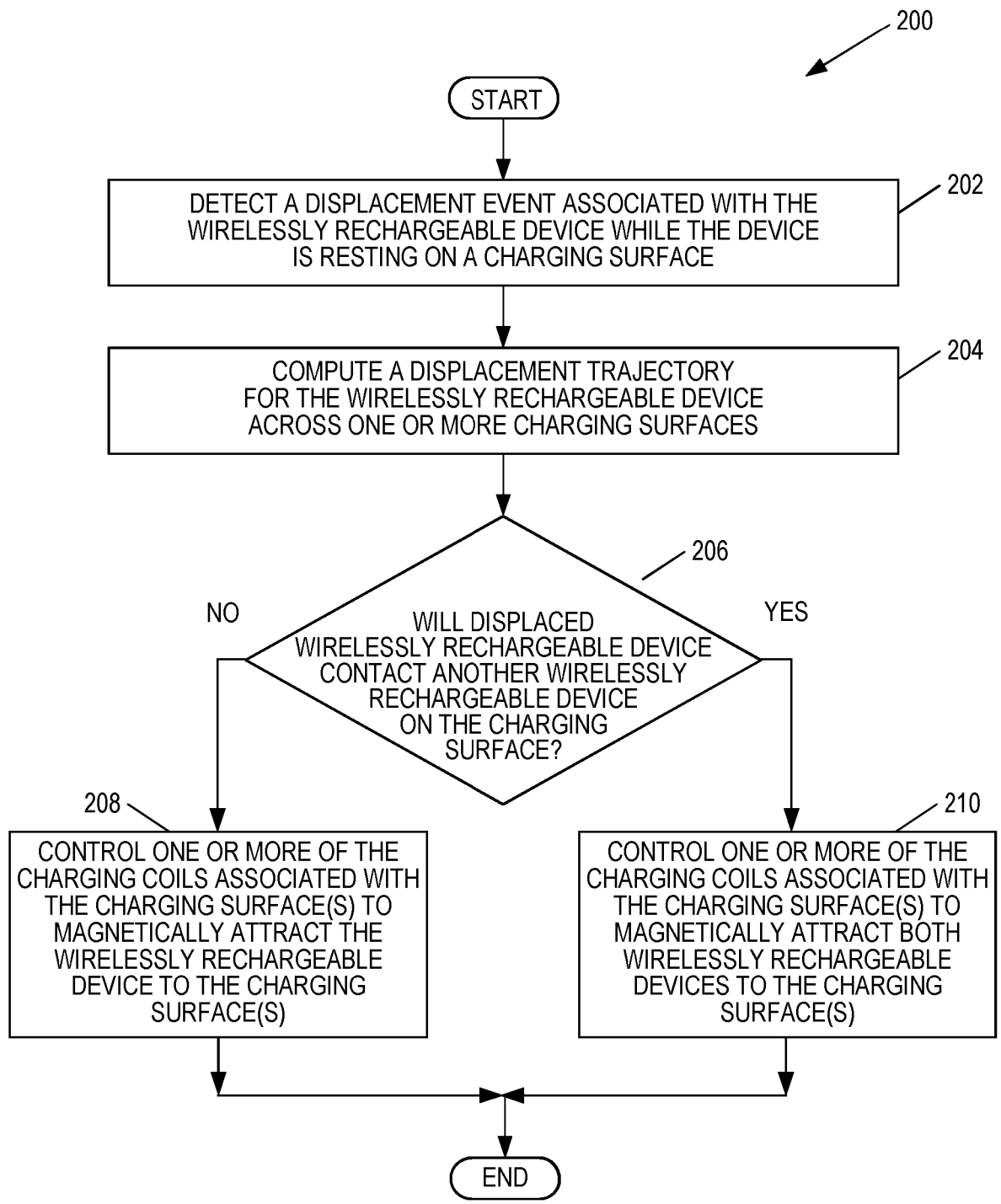
FIG. 10 is a flow diagram illustrating a method for inhibiting the unintentional displacement of multiple wirelessly rechargeable devices across the surfaces of one or more adjacent charging devices according to one embodiment.

FIG. 10 is a flow diagram illustrating a method 200 for determining whether such contact will occur between two devices 20-1, 20-2, and if so, for controlling the magnetic fields M associated with charging those devices to inhibit their movement across one or both of the charging surfaces S, $S_A$. Particularly, as seen in FIG. 10, method 200 begins when device 20-1 detects that it has been displaced (box 202). As described above, device 20-1 can then determine or predict its displacement trajectory across one or both of the charging surfaces S, $S_A$ (box 204). Device 20 will know in advance whether another wirelessly rechargeable device such as device 20-2 is also charging on charging surface S. For example, device 20-1 may communicate with one or both of the charging surfaces S, $S_A$ using any method known in the art (e.g., BLUETOOTH link) to dynamically learn the identities of other wirelessly rechargeable devices (e.g., device 20-2) currently being charged, as well as their respective positions on those surfaces. Alternatively, or additionally, device 20-1 may be configured to receive signals from device 20-2 as it rests on a charging surface. In either case, the determination may be performed when the user places device 20-1 on the charging surface S, or is within close proximity of the charging surface S. Regardless, however, device 20-1 will be able to determine whether device 20-2 will be contacted by device 20-1 based on the computed trajectory (box 206). If not, device 20-1 will simply control coils 29 and/or 59, as previously described, to inhibit the movement of device 20-1 across one or both of the charging surfaces S, $S_A$ (box 208). Otherwise, device 20-1 will generate the control signals necessary for controlling the coils 59 of one or both of the charging surfaces S, $S_A$, as well as the coils 29 of devices 20-1 and 20-2, so that both devices are magnetically attracted to a charging surface S, $S_A$ (box 210).

Figure 11:
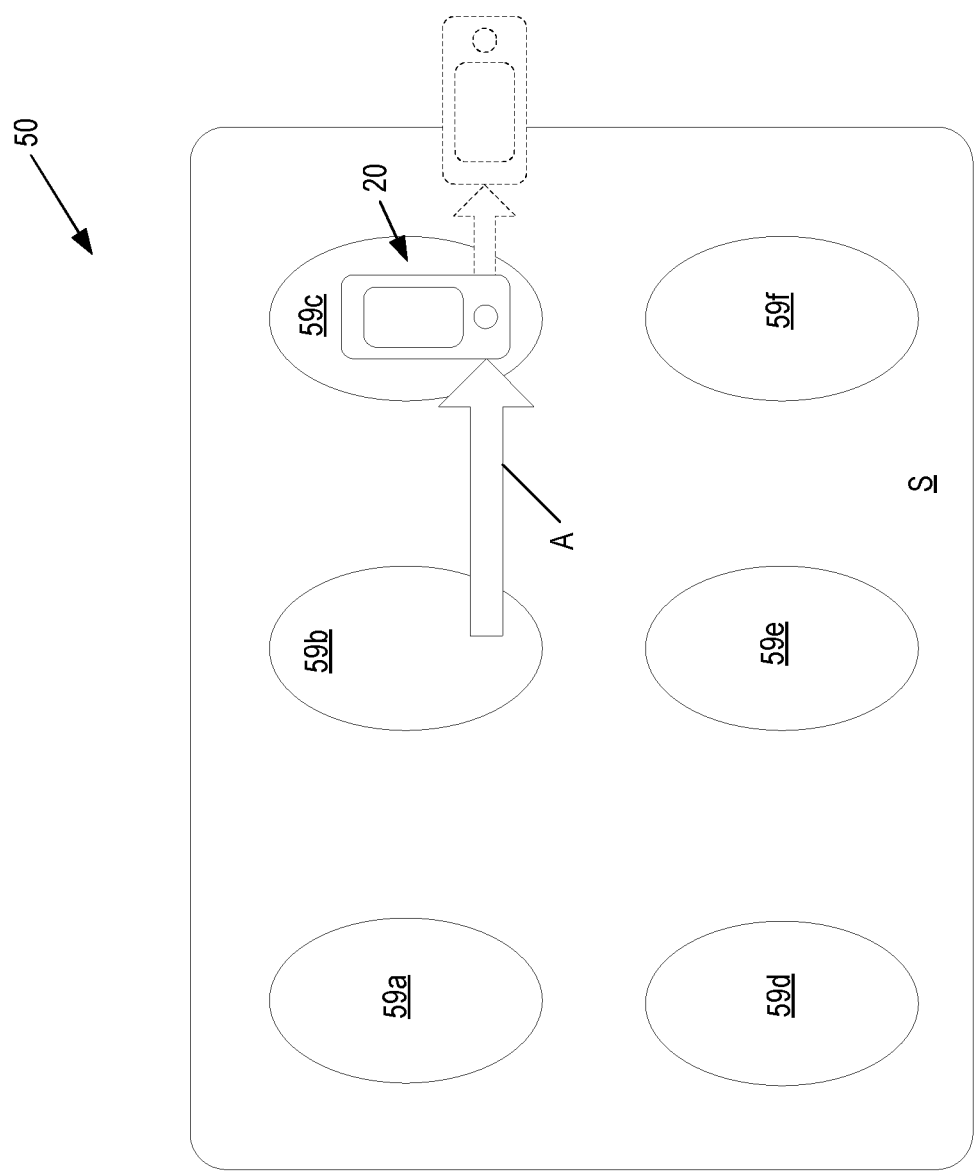
FIG. 11 illustrates one embodiment of the present disclosure in which a wirelessly rechargeable device being unintentionally displaced across the surface of a charging device is re-oriented to fall over the edge of the charging surface in an orientation that is least likely to damage the wirelessly rechargeable device.

In some instances, as seen in FIG. 11, the contact to device 20 resting on charging surface S may be hard enough such that the unintentional displacement will cause device 20 to fall over the edge of charging surface S. In these cases, the resultant fall could serious damage device 20. However, in one embodiment of the present disclosure, device 20 is configured to determine that it will fall over the edge of charging surface S, or is likely to fall over the edge of charging surface S, and in response, control the magnetic fields M of its own coils 29, or one or more selected coils 59 of charging surface S, to reorient device 20. The orientation (e.g., rotation of device 20 relative to charging surface S) would be such that device 20 would best survive the impending fall, or at least minimize the amount of damage that could potentially be experienced by device 20.

Figure 12:
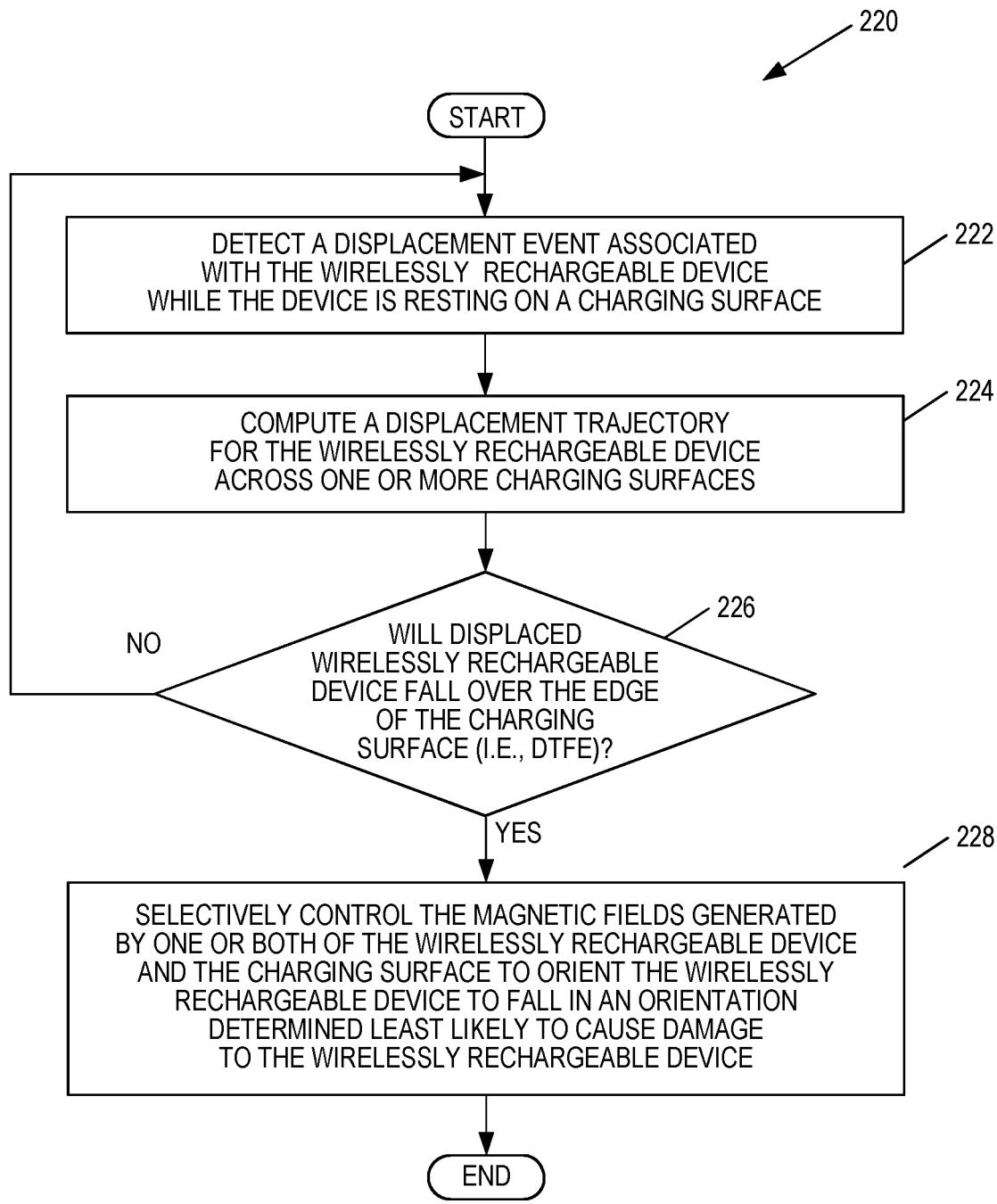
FIG. 12 is a flow diagram illustrating a method for re-orienting a wirelessly rechargeable device being unintentionally displaced over a charging surface to fall over the edge of the charging surface in an orientation that is least likely to damage the wirelessly rechargeable device.

FIG. 12 is a flow diagram illustrating a method 220 for device 20 to control the magnetic fields of coils 29 and/or 59 to reorient device 20. Particularly, upon detecting a displacement event (box 222), device 20 computes a displacement trajectory (box 224), as previously described. As part of determining the trajectory, device 20 may also determine whether the contact that caused the displacement was hard enough such that device 20 is likely to fall over the edge of charging surface S. This determination may be based on signals received from an accelerometer, or based on the analysis of multiple images, for example, or by any method known in the art. Regardless, however, if device 20 determines that it will not fall over the edge (box 226), device will generate control signals to control the magnetic field M of selected coils 59 to inhibit its displacement as previously described. Otherwise, upon detecting that device 20 will either fall off the charging surface S, or is likely to fall off of the charging surface S (i.e., a DTFE), device 20 will control the magnetic fields M generated by coils 29 and/or selected coils 59 to reorient the device 20 (box 228).

By way of example only, device 20 may generate the control signals necessary to control the magnetic field(s) M such that device 20 is displaced to move in a predetermined direction (e.g., towards a wall or other barrier rather than over the edge of charging surface S). In this embodiment, the device 20 may control some coils to generate a magnetic field that attracts device 20, while controlling other coils to generate a magnetic field that repels device 20.

In another embodiment, device 20 may control coils 29, 59 to generate a magnetic field M that biases a heavier part of device 20 (e.g., the end of device 20 where the battery is located), towards the edge of the charging surface S. In these cases, the heavier part of device 20, which may be better able to withstand an impact, would strike the floor first, thereby eliminating or greatly reducing any damage that may occur to device 20 as a result of the fall.

Figure 13:
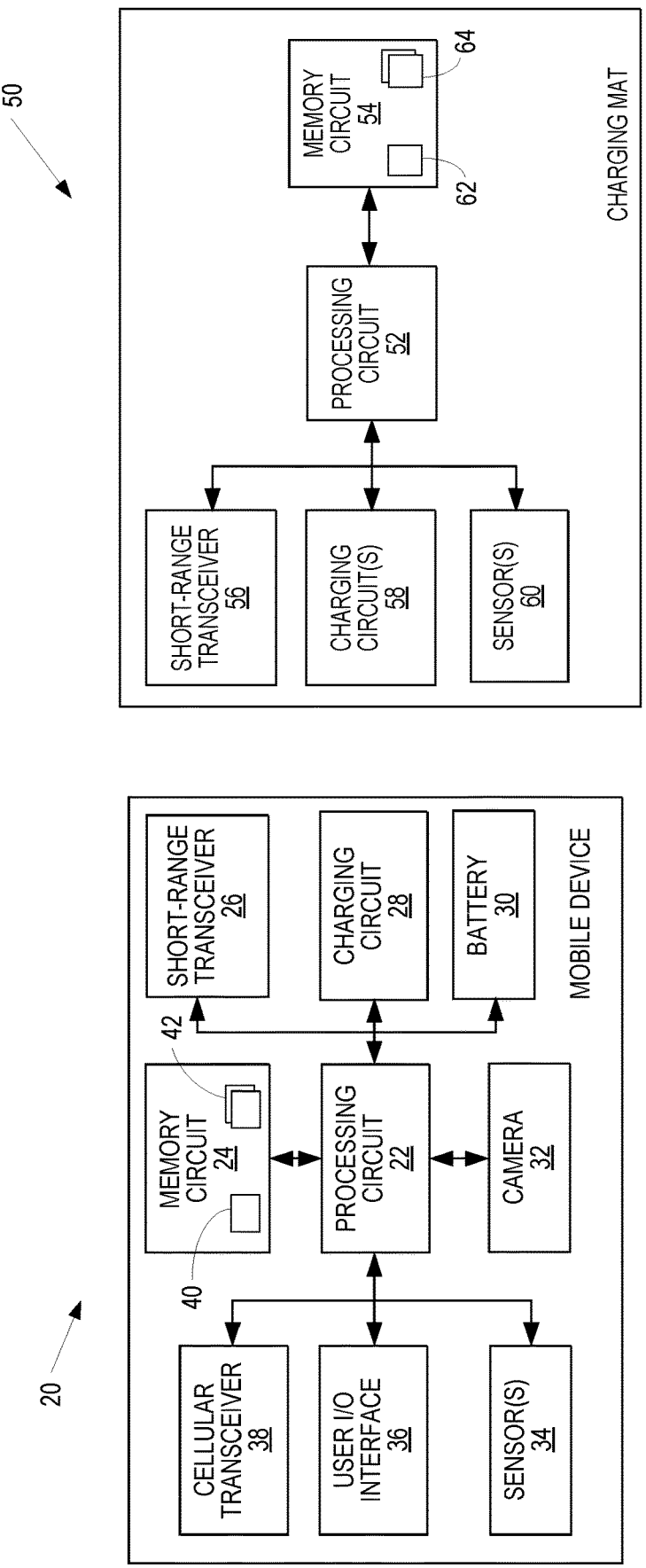
FIG. 13 is a block diagram showing some functional components of a wirelessly rechargeable device and a charging device according to one embodiment of the present disclosure.

FIG. 13 is a functional block diagram illustrating some of the components of a wirelessly rechargeable device 20 and a charging device 50 configured according to one embodiment. As seen in FIG. 13, wirelessly rechargeable device 20 comprises a processing circuit 22, a memory circuit 24, a short-range transceiver 26, a charging circuit 28, a battery 30, a camera 32, one or more sensors 34 a user Input/Output (I/O) interface 36, and a cellular transceiver 38. In the embodiment of FIG. 13, device 20 is a cellular telephone. However, as stated above, device 20 may be any wirelessly rechargeable device capable of being charged by a wireless charger such as charging device 50. Therefore, some devices that are suitable to be configured according to the present disclosure may not comprise all the components seen in FIG. 13.

Processing circuit 22, which may comprise one or more microprocessors, microcontrollers, hardware circuits, or a combination thereof, generally controls control the operation of the wirelessly rechargeable device 20. Configured according to one or more embodiments of the present disclosure, the processing circuit 22 receives and processes signals from the one or more sensors 34, and determines, based on those signals, whether device 20 is being displaced intentionally, or unintentionally, as previously described. In some embodiments, device 20 may lack such sensing capabilities. Therefore, processing circuit 22 is also able to make such determinations responsive to information and/or control signals received from other devices, such as charging device 50. Regardless of the origin of the information on which the determination is made, however, processing circuit 22 is configured to generate the necessary control signals to control the magnetic fields M of selected coils 29, 59 to inhibit an unintentional displacement of device 20 over the charging surface S, or to reorient device 20 such that it is better able to withstand a fall over the edge of a charging device 50.

Memory circuit 24 stores the program code and data needed by the processing circuit 22 to operate as herein described. Memory circuit 24 may comprise any combination of volatile and non-volatile memory devices, and may include discrete memory devices as well as internal memory. Program code executed by the processing circuit 22 is typically stored in a non-volatile memory such as a read-only memory (ROM) or flash memory, while temporary data generated during operation of the wirelessly rechargeable device 20 may be stored in a volatile memory, such as a random access memory (RAM).

In one embodiment of the present disclosure, memory circuit 24 stores a control application 40, which comprises the instructions and code for controlling the operation of device 20, and one or more displacement signatures 42. As previously described, each signature 42 comprises an "electronic signature" (i.e., characteristic sensor data) that represents a substantially vertical movement of device 20. Such signatures may be pre-provisioned in memory 24 by a manufacturer, for example, and thereafter updated by processing circuit 22. Additionally or alternatively, the displacement signatures may be learned by device 20 and stored by processing circuit over time. This allows the processing circuit 22 to "learn" new displacement signatures, as well as to customize existing displacement signatures. As previously described, the processing circuit 22 is configured to compute a displacement signature, and then compare those computed signatures to the displacement signatures 42 stored in memory 24 to determine whether a detected displacement is intended or unintended.

Short-range transceiver 26 may comprise any transceiver known in the art capable of transmitting and receiving data and signals with a corresponding short-range transceiver 56 disposed in the charging device 50, for example. Some suitable short-range transceivers include, but are not limited to, BLUETOOTH transceivers, Near Field Communication (NFC) transceivers, and InfraRed (IR) transceivers. Each of these transceivers communicates data and signals using respective protocols that are well-known and well-understood in the art. Therefore, no further discussion is contained herein with respect to their particular methods of communication. It is enough to say, however, that the short-range transceiver 26 may be controlled to pair or otherwise establish a communications link with the short-range transceiver 56 in the charging device 50 such that the two devices may communicate signals and/or data regarding the unintentional displacement of device 20 across charging surface S, and further, to effect the control of one or both of the coils 29, 59 to inhibit the displacement of device 20 across the charging surface S.

Charging circuit 28 comprises the conventional circuitry needed for generating a current to charge battery 30 when device 20 is resting on charging surface S. Such circuitry includes coil 29. As described above, the charging current is generated by the magnetic field M. However, in addition to its conventional functions, charging circuit 28 is also configured to control a magnetic field it generates, responsive to signals from processing circuit 22, to inhibit the unintended displacement of device 20 over charging surface S. By way of example only, a current may be selectively provided to coil 29 in charging circuit 28 to control the direction of the magnetic field it generates. Altering the magnetic field M generated by coil 29 will, as previously discussed, magnetically attract device 20 temporarily to charging surface S, or alter the orientation of device 20 relative to the charging surface S.

The battery 30 may comprise any rechargeable battery known in the art, while camera 32 and sensors 34 (e.g., accelerometers) are integrated into device 20. In some situations, one or both of the sensors 34 and camera 32 may be controlled by processing circuit 22 to capture images and detect displacement characteristics responsive to detecting an event that causes device 20 to be displaced over the charging surface S. This information may be utilized by processing circuit 22 to compute displacement trajectories, and to determine whether device 20 will fall over the edge of charging surface S, or is likely to fall over the edge of charging surface S, as previously described.

The user I/O interface 36 and the communications interface circuit 38 comprise components whose functions are well-known in the art. Particularly, the user I/O interface 36 comprises the components necessary for the user to interact and control the operation of wirelessly rechargeable device 20. By way of example, the user I/O interface 36 may comprise such well-known components as a display, a keypad, a microphone and speaker, and various other controls and buttons as is known in the art.

The communications interface circuit 38 comprises a receiver and transmitter interface for communicating with one or more other remotely located devices over a communications network. As stated above, this embodiment of device 20 is a cellular telephone. Therefore, communications interface circuit 38 comprises a radio transceiver configured to communicate with remote parties and devices via a wireless communications network, such as a mobile communications network. For example, the communications interface circuit 38 may be configured to communicate across an air interface with at least one node of a radio access network, such as a base station (BS), utilizing any well-known protocol or that may be developed. Some exemplary protocols include, but are not limited to, IEEE 802.xx, CDMA, WCDMA, GSM, EDGE, LTE, UTRAN, E-UTRAN, WiMax, and the like.

In some embodiments, device 20 may also communicate over a packet-switched network (e.g., the Internet) with other devices. In these cases, the communications interface circuit 38 may effect such communications using one or more communication protocols known in the art or that may be developed, such as IMS/SIP, Diameter, HTTP, RTP, RTCP, HTTPs, SRTP, CAP, DCCP, Ethernet, TCP/IP, SONET, ATM, or the like. Thus, the communication interface circuit 38 implements receiver and transmitter functionality appropriate to communication network links (e.g., optical, electrical, and the like), and the transmitter and receiver functions may share circuit components and/or software, or alternatively may be implemented separately.

The charging device 50, as seen in FIG. 13, comprises a processing circuit 52, a memory circuit 24, one or more sensors 60, one or more charging circuits 59, and a short-range transceiver 56. Processing circuit 52 also comprises circuitry such as one or more microprocessors, microcontrollers, hardware circuits, or a combination thereof, and generally controls the operations and functions of the charging device 50 according to one or more embodiments of the present disclosure. For example, processing circuit 52 may comprise circuitry configured to detect whether a device 20 resting on its charging surface S has been unintentionally displaced, as well as execute instructions and code stored in memory 54, such as that of control application 62, to perform the functions described herein. As above, the memory circuit 54 and the processing circuit 52 may comprise separate components that communicate with each other via a bus, for example, or they may be incorporated as a unitary module or circuit.

In one or more embodiments of the present disclosure, processing circuit 52 is configured to receive and process signals from the one or more sensors 60 and/or from device 20 via short-range transceiver 56. Based on those signals, processing circuit 52 may determine whether device 20 has been unintentionally displaced across charging surface S. In addition, processing circuit 52 may also control its charging circuit 59 to inhibit the displacement of device 20 across charging surface S, and/or reorient device 20, as previously described.

The functions of the memory circuit 54, sensors 60, charging circuit(s) 59, which includes coil(s) 59, and short-range transceiver 56, are similar to those functions described above with respect to the wirelessly rechargeable device 20. Thus, the memory circuit 54, which may comprise any combination of volatile and non-volatile memory devices, and may include discrete memory devices as well as internal memory, also has the capability for storing a control application 62 and one or more displacement signatures 64. As described above, the control application 62, when executed by processing circuit 52, controls the functions of the charging device 50. Additionally, control application 62 configures processing circuit 52 for determining whether device 20 has been unintentionally displaced across charging surface S, and for controlling charging circuit 59 to inhibit the displacement of device 20 across charging surface S, and/or reorient device 20, relative to charging surface S.

The short-range transceiver 56 may comprise a BLUETOOTH transceiver, an NFC transceiver, or an IR transceiver, for example, that establishes communication links with the wirelessly rechargeable device 20 in some embodiments. So established, the wirelessly rechargeable device 20 and the charging device 50 can communicate information and data with each other, and perform the functionality described herein. The sensors 60, like sensors 34 above, may detect movement of device 20 across charging surface S, as well as provide the signals necessary for processing circuit 52 to determine particular characteristics of that detected movement.

Figure 14:
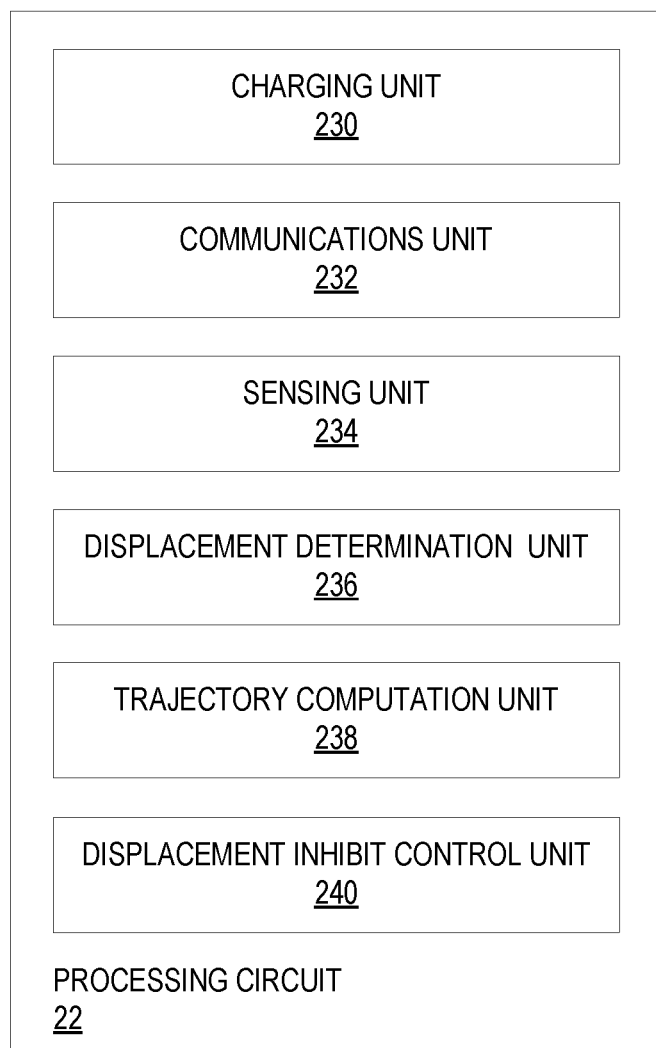
FIG. 14 is a functional unit diagram of a processing circuit configured according to one embodiment of the present disclosure.
Figure 16B:
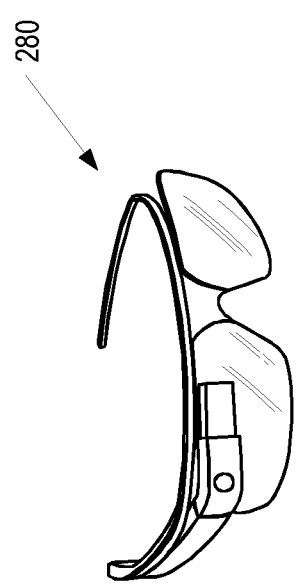
FIGS. 16A-16D are perspective views of some exemplary wirelessly rechargeable devices suitable for use according to various embodiments of the present disclosure.
Figure 16D:
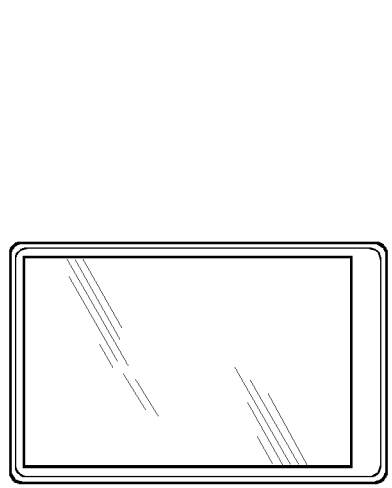
Figure 16A:
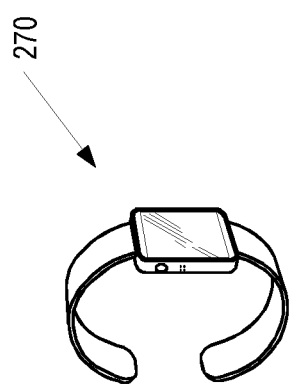
Figure 16C:
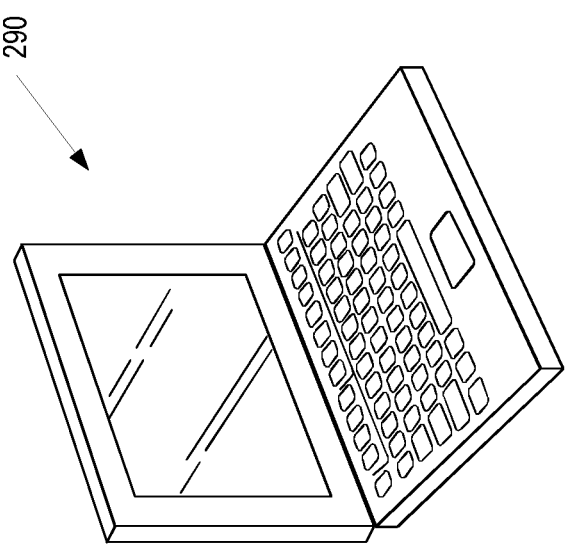

FIG. 14 is a functional block diagram illustrating functional units of processing circuit 22 configured according to one embodiment of the present disclosure. Each unit 230, 232, 234, 236, 238, and 240 seen in FIG. 14 may be implemented by either the wirelessly rechargeable device 20 or the charging device 50, or by some other peripheral device, and may comprise dedicated hardware, programmable hardware together with appropriate firmware, or one or more processors together with appropriate computer program modules.

As seen in FIG. 14, the units comprise a charging unit 230, a communications unit 232, a sensing unit 234, a displacement determination unit 236, a trajectory computation unit 238, and a displacement inhibit control unit 240. The charging unit 230 comprises circuitry for charging battery 30, as is conventional, and for controlling a magnetic field M responsive to control signals received from the displacement inhibit control unit 240. To that end, the charging unit 230 may control a current provided to coils 29.

The communications unit 232 may comprise circuits operative to send and receive signals and data to one or more remote parties via a network, as is known in the art, as well as to a charging device 50 via a short-range communications interface, as previously described. The communications unit 232, which is operatively connected to the other units 230, 234, 236, 238, 240, may communicate with such remote parties using any known communications protocols known in the art. In one embodiment, the communications unit 232 comprises, for example, an interface for performing receiver and transmitter functions. In other embodiments, however, the communications unit 232 comprises radio transceiver circuitry configured to facilitate communications between the wirelessly rechargeable device 20 and charging device 50. Regardless of the embodiment, however, the communications unit 232 includes transmitter and receiver functionality that may share circuit components and/or software, or alternatively may be implemented separately as independent circuit components.

The sensing unit 234 is operative to detect whether the wirelessly rechargeable device 20 has been displaced relative to the charging surface S, as previously described, and to generate signals to indicate such detection to the displacement determination unit 236. Thus, in at least one embodiment, the sensing unit 234 performs the functions described previously with respect to the one or more sensors 34 and/or 60.

The displacement determination unit 236 comprises the hardware and/or software necessary for determining whether wirelessly rechargeable device 20 has been displaced such that device 20 is moving over the charging surface S. Additionally, the displacement determination unit 236 is configured to determine whether the detected displacement is an intended displacement or an unintentional or accidental displacement. Upon making the determination, the displacement determination unit 236 may provide one or more signals to the trajectory computation unit 238 and/or the displacement inhibit control unit 238 to inhibit the displacement of device 20 across charging surface S, or to reorient device 20 if it is determined that device 20 will fall, or is likely to fall, over the edge of charging surface S and onto the floor. As previously described, such functions may be performed in response to signals received at the displacement determination unit 236 from one or both of the sensing unit 234 and the communications unit 232.

The trajectory computation unit 238 receives signals from the displacement determination unit 236 and the sensing unit 234, and computes a displacement trajectory for device 20, as previously described. In embodiments of the present disclosure, the received signals may comprise measurement signals provided to the sensing unit 234 by sensors 34 and/or 60, and may also comprise signals representing the results of processing performed on images captured by camera 32. In addition, the trajectory computation unit 238 outputs one or more values to indicate the computed trajectory to the displacement inhibit control unit 240.

Upon receipt of the trajectory, the displacement inhibit control unit 240 analyzes the values and generates one or more control signals to selectively control the magnetic field(s) M generated by coils 29 and/or coils 59. As previously described, the control signals generated by the displacement inhibit control unit 240 may control one or both of the coils 29, 59 to attract the wirelessly rechargeable device 20 to the charging surface S, or they may control one or both of the coils 29, 59 to bias a particular part of device 20 towards a predetermined direction, effectively reorienting device 20 relative to charging surface S.

FIG. 15 is a functional block diagram illustrating functional modules of control application 40 according to one embodiment of the present disclosure. Each module 230, 232, 234, 236, 238, and 240 seen in FIG. 15 may be stored in the memory 24, 54 and is executed by the processing circuit 22, 52 at the wirelessly rechargeable device 20 and/or the charging device 50, or by some other peripheral device.

As seen in FIG. 15, the modules comprise a charging module 250, a communications module 252, a sensing module 254, a displacement determination module 256, a trajectory computation module 258, and a displacement inhibit control module 260. Charging module 250 comprises computer program code related to charging battery 30 and to monitoring the battery 30, as is conventional. However, according to one or more embodiments of the present disclosure, the charging module 250 is also configured to receive signals from the displacement inhibit control module 260, and in response thereto, control a magnetic field M. To that end, the charging module 250 may control a current provided to coils 29.

The communications module 252 may comprise code for sending and receiving signals and data to one or more remote parties via a network, as is known in the art, as well as to a charging device 50 via a short-range communications interface, as previously described. The communications module 252, which is communicatively linked to one or more of the other modules 250, 254, 256, 258, 260, may communicate with such remote parties using any known communications protocols known in the art. In one embodiment, the communications module 252 comprises, for example, an interface for performing receiver and transmitter functions. In other embodiments, however, the communications module 252 comprises code and instructions for a radio transceiver to facilitate communications between the wirelessly rechargeable device 20 and charging device 50.

The sensing module 254 comprises code for facilitating the ability of the processing circuit 22 to detect whether the wirelessly rechargeable device 20 has been displaced relative to the charging surface S, as previously described, and to generate signals to indicate such detection to the displacement determination module 256. Thus, in at least one embodiment, the sensing module 254 performs the functions described previously with respect to the one or more sensors 34 and/or 60.

The displacement determination module 256 comprises the software necessary for determining whether wirelessly rechargeable device 20 has been displaced such that device 20 is moving over the charging surface S. Additionally, the displacement determination module 256 is configured to determine whether the detected displacement is an intended displacement or an unintentional or accidental displacement. Upon making the determination, the displacement determination module 256 may provide one or more signals to the trajectory computation module 258 and/or the displacement inhibit control module 258 to inhibit the displacement of device 20 across charging surface S, or to reorient device 20 if it is determined that device 20 will fall, or is likely to fall, over the edge of charging surface S and onto the floor. As previously described, such functions may be performed in response to signals received at the displacement determination module 256 from one or both of the sensing module 254 and the communications module 252.

The trajectory computation module 258 receives signals from the displacement determination module 256 and the sensing module 254, and computes a displacement trajectory for device 20, as previously described. In embodiments of the present disclosure, the received signals may comprise measurement signals provided to the sensing module 254 by sensors 34 and/or 60, and may also comprise signals representing the results of processing performed on images captured by camera 32. In addition, the trajectory computation module 258 outputs one or more values to indicate the computed trajectory to the displacement inhibit control module 260.

Upon receipt of the trajectory, the displacement inhibit control module 260 analyzes the values and generates one or more control signals to selectively control the magnetic field(s) M generated by coils 29 and/or coils 59. As previously described, the control signals generated by the execution of the displacement inhibit control module 260 may control one or both of the coils 29, 59 to attract the wirelessly rechargeable device 20 to the charging surface S, or they may control one or both of the coils 29, 59 to bias a particular part of device 20 towards a predetermined direction, effectively reorienting device 20 relative to charging surface S.

The previous embodiments describe embodiments of the present disclosure as if the wirelessly rechargeable device 20 were a cellular telephone. However, the present invention is not so limited. FIGS. 16A-16D illustrate other types of wirelessly rechargeable devices that may be configured to function according to other embodiments of the present disclosure. Such devices include, but are not limited to, wearable computing devices such as a so-called smartwatch 270 or a pair of augmented glasses 280, a laptop or notebook computer 290, and a tablet computing device 300.

The present disclosure may, of course, be carried out in other ways than those specifically set forth herein without departing from essential characteristics of the disclosure. Therefore, the present embodiments are to be considered in all respects as illustrative and not restrictive, and all changes coming within the meaning and equivalency range of the appended claims are intended to be embraced therein.

What is claimed is:

1. A method for inhibiting a displacement of a wirelessly rechargeable device positioned on a charging surface of a charging device, the method comprising:
   after the wirelessly rechargeable device is placed on the charging surface, detecting whether the wirelessly rechargeable device is being displaced, or is likely to be displaced; and
   in response to detecting that the wirelessly rechargeable device is being displaced, or is likely to be displaced, inhibiting movement of the wirelessly rechargeable device relative to the charging surface, wherein inhibiting the movement of the wirelessly rechargeable device comprises controlling a magnetic field generated by one or both of the wirelessly rechargeable device and the charging device.

2. A wirelessly rechargeable device comprising:
   a battery;
   a charging circuit operatively connected to the battery; and
   a processing circuit operatively connected to the charging circuit and configured to:
   detect whether the wirelessly rechargeable device is being displaced, or is likely to be displaced, while the wirelessly rechargeable device is on the charging surface; and
   in response to detecting that the wirelessly rechargeable device is being displaced, or is likely to be displaced, inhibit a movement of the wirelessly rechargeable device relative to the charging surface, wherein inhibiting the movement of the wirelessly rechargeable device comprises controlling a magnetic field generated by one or both of the wirelessly rechargeable device and the charging device.

3. The wirelessly rechargeable device of claim 2, wherein detecting whether the wirelessly rechargeable device is being displaced includes determining whether the wirelessly rechargeable device is being unintentionally displaced and wherein the step of inhibiting the movement of the wirelessly rechargeable device is performed as a result of determining that the wirelessly rechargeable device was unintentionally displaced.

4. The wirelessly rechargeable device of claim 3, wherein the processing circuit is further configured to:
   capture a plurality of images of an object approaching the wirelessly rechargeable device while the wirelessly rechargeable device is on the charging surface; and
   predict, based on processing the plurality of images, whether an impending contact between the object and the wirelessly rechargeable device will result in an unintentional displacement of the wirelessly rechargeable device, or an intended displacement of the wirelessly rechargeable device.

5. The wirelessly rechargeable device of claim 3, wherein the processing circuit is further configured to:
   detect a substantially horizontal movement of the wirelessly rechargeable device across the charging surface;
   capture a plurality of images of a user positioned proximate the wirelessly rechargeable device;
   process the plurality of images to determine whether the user is substantially stationary relative to the charging surface; and
   determine that the wirelessly rechargeable device has been unintentionally displaced if the user is substantially stationary.

6. The wirelessly rechargeable device of claim 3, wherein the processing circuit is further configured to:
   measure movement of the wirelessly rechargeable device using one or more sensors; and
   classify the movement as an intended displacement of the wirelessly rechargeable device, or an unintentional displacement of the wirelessly rechargeable device, based on the measured movement.

7. The wirelessly rechargeable device of claim 6, wherein the processing circuit is further configured to classify the movement as an intended displacement if the wirelessly rechargeable device is being moved substantially vertically with respect to the charging surface, or as an unintentional displacement if the wirelessly rechargeable device is being moved substantially horizontally with respect to the charging surface.

8. The wirelessly rechargeable device of claim 2, wherein the processing circuit is further configured to cause the magnetic field generated by one or both of the wirelessly rechargeable device and the charging device to magnetically attract the wirelessly rechargeable device to the charging surface.

9. The wirelessly rechargeable device of claim 2, the processing circuit is further configured to:
   compute a displacement trajectory for the wirelessly rechargeable device across the charging surface; and
   based on the computed displacement trajectory, control selected charging coils associated with the charging surface to generate corresponding magnetic fields to magnetically attract the wirelessly rechargeable device to the charging surface.

10. The wirelessly rechargeable device of claim 9, wherein the processing circuit is further configured to:
    measure changes in magnetic fields as the wirelessly rechargeable device moves across the charging surface; and
    compute the displacement trajectory based on the measured changes.

11. The wirelessly rechargeable device of claim 9, wherein the processing circuit is further configured to:
    capture a plurality of images as the wirelessly rechargeable device moves across the charging surface; and
    compute the displacement trajectory based on processing the plurality of images to determine an acceleration and direction of movement of the wirelessly rechargeable device.

12. The wirelessly rechargeable device of claim 9, wherein the processing circuit is further configured to control charging coils associated with the charging surface to magnetically attract the wirelessly rechargeable device to the charging surface if the displacement trajectory of the wirelessly rechargeable device cannot be computed.

13. The wirelessly rechargeable device of claim 2, wherein the processing circuit is further configured to:
    determine that the wirelessly rechargeable device being displaced will contact another wirelessly rechargeable device resting on the charging surface; and
    control one or more of charging coils associated with the charging surface to magnetically attract both the wirelessly rechargeable device and said another wirelessly rechargeable device to the charging surface.

14. The wirelessly rechargeable device of claim 2, wherein the processing circuit is further configured to detect that the wirelessly rechargeable device is likely to fall over an edge of the charging surface and onto an underlying surface.

15. The wirelessly rechargeable device of claim 14, wherein the processing circuit is further configured to orient the wirelessly rechargeable device to fall in an orientation determined least likely to cause damage to the wirelessly rechargeable device.

16. The wirelessly rechargeable device of claim 15, wherein to orient the wirelessly rechargeable device, the processing circuit is further configured to selectively cause magnetic fields generated by one or both of the wirelessly rechargeable device and the charging surface such that the heaviest part of the wirelessly rechargeable device is likely to strike the underlying surface first.

17. A computer program product comprising a computer-readable storage medium comprising a control application stored thereon that, when executed by processing circuit of a wirelessly rechargeable device resting on a charging surface, controls the processing circuit to perform a process that comprises:
    after the wirelessly rechargeable device is placed on the charging surface, detecting whether the wirelessly rechargeable device is being displaced, or is likely to be displaced; and
    in response to detecting that the wirelessly rechargeable device is being displaced, or is likely to be displaced, inhibiting movement of the wirelessly rechargeable device relative to the charging surface, wherein inhibiting the movement of the wirelessly rechargeable device comprises controlling a magnetic field generated by one or both of the wirelessly rechargeable device and the charging device.

18. The computer program product of claim 17, wherein controlling the magnetic field generated by one or both of the wirelessly rechargeable device and the charging device comprises controlling the magnetic field generated by one or both of the wirelessly rechargeable device and the charging device to magnetically attract the wirelessly rechargeable device to the charging surface.

19. The computer program product of claim 17, the process further comprises:
    computing a displacement trajectory for the wirelessly rechargeable device across the charging surface; and
    based on the computed displacement trajectory, controlling selected charging coils associated with the charging surface to generate corresponding magnetic fields to magnetically attract the wirelessly rechargeable device to the charging surface.

20. The computer program product of claim 19, the process further comprises:
    capturing a plurality of images as the wirelessly rechargeable device moves across the charging surface, wherein computing the displacement trajectory comprises processing the plurality of images to determine an acceleration and direction of movement of the wirelessly rechargeable device.

* * * * *